(12) United States Patent
Hirai et al.

(10) Patent No.: US 8,314,906 B2
(45) Date of Patent: Nov. 20, 2012

(54) PHASE DELAY ELEMENT FOR TRANSMISSIVE AND REFLECTIVE TYPE LIQUID CRYSTAL DISPLAY

(75) Inventors: Akira Hirai, Seongnam-si (KR); Jin-Hyuk Yun, Seoul (KR); Kee-Han Uh, Yongin-si (KR); Min-Soo Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 254 days.

(21) Appl. No.: 12/628,482

(22) Filed: Dec. 1, 2009

(65) Prior Publication Data

US 2010/0091216 A1    Apr. 15, 2010

Related U.S. Application Data

(62) Division of application No. 11/184,436, filed on Jul. 19, 2005, now Pat. No. 7,656,480.

(30) Foreign Application Priority Data

Jul. 19, 2004 (KR) .................................. 2004-55827

(51) Int. Cl.
*G02F 1/1335* (2006.01)
(52) U.S. Cl. ..................................................... 349/114
(58) Field of Classification Search .................. 349/114
See application file for complete search history.

(56) References Cited

U.S. PATENT DOCUMENTS

| | | | |
|---|---|---|---|
| 6,704,081 B2 * | 3/2004 | Ha et al. ........................ | 349/114 |
| 6,717,632 B2 * | 4/2004 | Ha et al. ........................ | 349/43 |
| 6,734,935 B2 * | 5/2004 | Kim et al. ...................... | 349/114 |
| 6,909,486 B2 | 6/2005 | Wang et al. | |
| 7,113,238 B2 | 9/2006 | Okumura | |
| 7,218,363 B2 * | 5/2007 | Ozawa et al. ................. | 349/114 |
| 7,619,705 B2 * | 11/2009 | Ozawa et al. ................. | 349/114 |
| 2001/0020990 A1 | 9/2001 | Moon | |
| 2004/0105059 A1 | 6/2004 | Ohyama et al. | |
| 2004/0189904 A1 | 9/2004 | Kang et al. | |

(Continued)

FOREIGN PATENT DOCUMENTS

CN    1342191 A    3/2002

(Continued)

OTHER PUBLICATIONS

European Office Action for Application No. 05 015 191.9-2205 dated Jul. 24, 2007.

*Primary Examiner* — James Dudek
(74) *Attorney, Agent, or Firm* — Cantor Colburn LLP

(57) ABSTRACT

A phase delay element includes a brightness enhancement layer intermediate a reflection layer and an artificial light. The brightness enhancement layer is defined by a first surface and an opposite second surface. The first surface faces the reflection layer. A first light from the artificial light is incident on the second surface. A phase of the first light is delayed by about 1/4 phase ($\lambda/4$) so that a second light is emitted from the first surface toward the reflection layer. The second light is reflected from the reflection layer so that a third light is emitted from the reflection layer toward the first surface. A phase of the third light is delayed by about 1/4 phase ($\lambda/4$) so that a fourth light is emitted from the second surface. Therefore, a portion of the artificial light, which is reflected from the reflection layer, is recycled to improve a luminance of an LCD apparatus.

18 Claims, 22 Drawing Sheets

U.S. PATENT DOCUMENTS

| | | |
|---|---|---|
| 2005/0122453 A1 | 6/2005 | Jang et al. |
| 2007/0019138 A1 | 1/2007 | Kubo et al. |
| 2008/0198306 A1 | 8/2008 | Shibazaki |

FOREIGN PATENT DOCUMENTS

| | | |
|---|---|---|
| CN | 1391129 A | 1/2003 |
| CN | 1438529 A | 8/2003 |
| JP | 11-002722 A | 1/1999 |
| JP | 2003-140152 A | 5/2003 |
| JP | 2004-325687 A | 11/2004 |
| KR | 1020010068465 A | 7/2001 |
| KR | 1020040025626 A | 3/2004 |
| KR | 1020040029040 A | 4/2004 |
| KR | 1020040044161 A | 5/2004 |
| TW | 200405085 | 4/2004 |

* cited by examiner

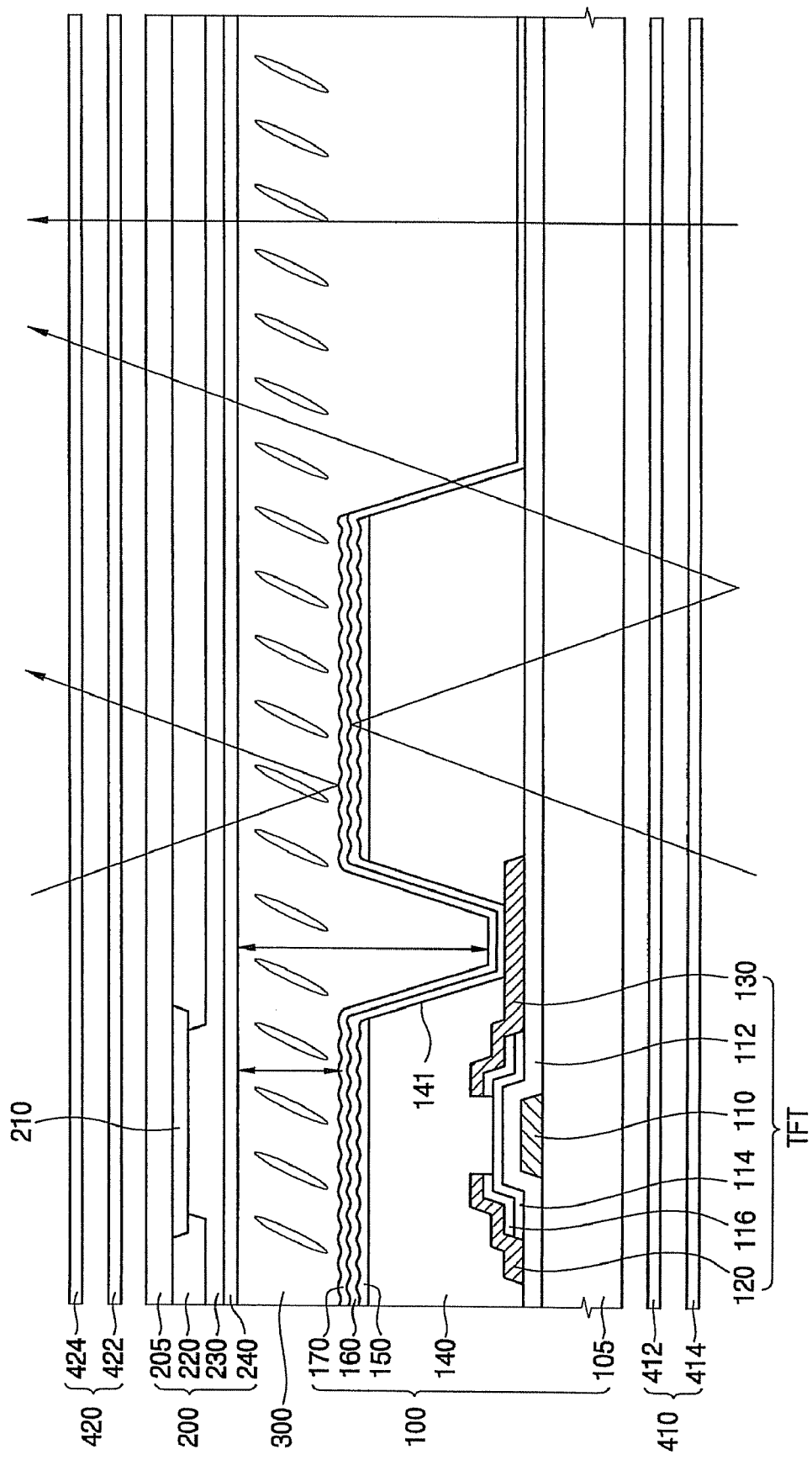

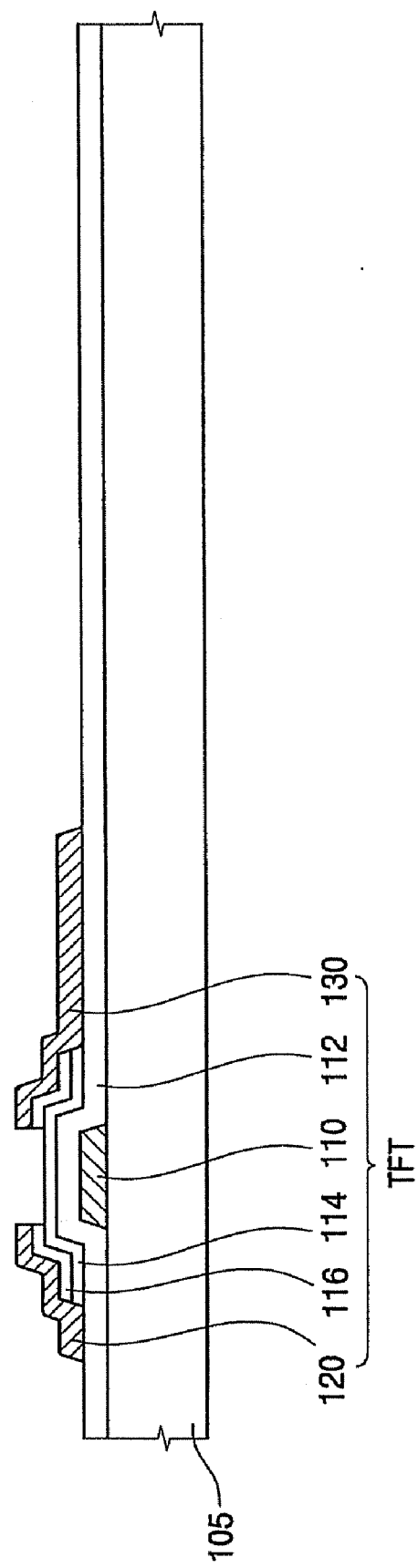

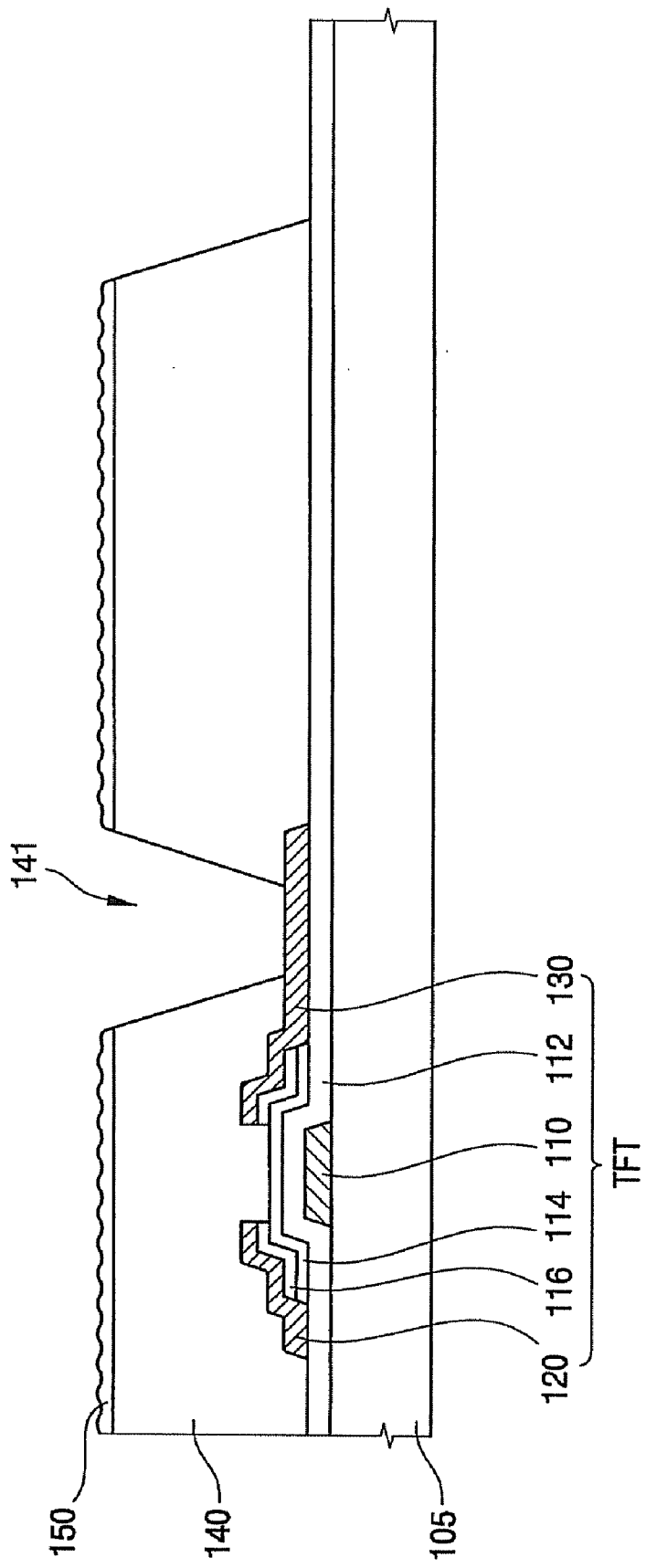

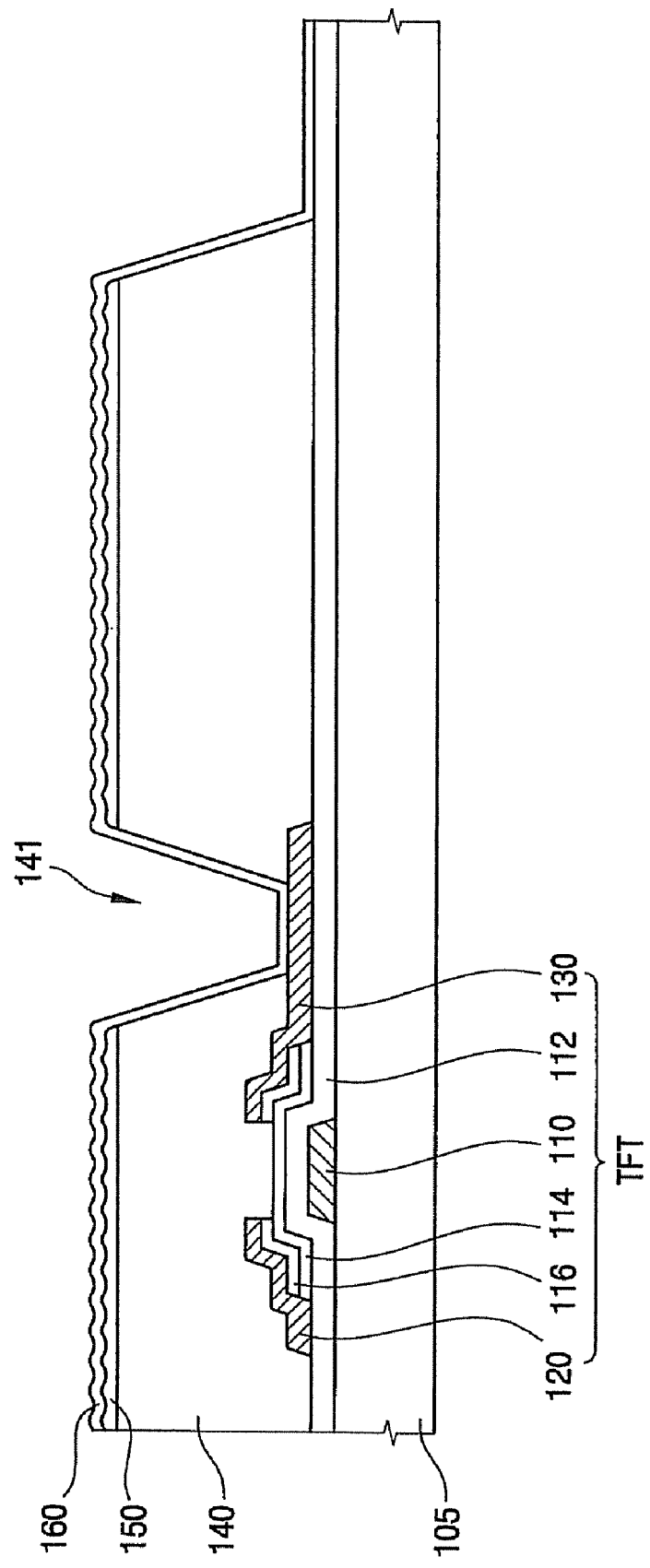

PHASE DELAY ELEMENT FOR TRANSMISSIVE AND REFLECTIVE TYPE LIQUID CRYSTAL DISPLAY

CROSS-REFERENCE TO RELATED APPLICATIONS

This application is a divisional application of U.S. application Ser. No. 11/184,436, filed Jul. 19, 2005, which claims the benefit of Korean Patent Application No. 10-2004-55827, filed on Jul. 19, 2004, in the Korean Intellectual Property Office, the disclosure of which is incorporated herein in its entirety by reference.

BACKGROUND OF THE INVENTION

1. Field of the Invention

The present invention relates to a phase delay element for a liquid crystal display, and more particularly, to phase delay element for a transmissive and reflective type liquid crystal display in which the display operation is carried out in a reflection mode of a low power consumption at a bright place where a light amount is abundant and the display operation is also carried out in a transmission mode of a high luminance at a dark place where a light amount is deficient

2. Description of the Related Art

In an information-oriented society these days, the role of an electronic display is getting more important. All kinds of electronic displays are widely used in various industrial fields.

Generally, the electronic display is an apparatus for visually providing a variety of information to a person. In other words, an electrical information signal output from various electronic devices is converted into a visually recognizable optical information signal at the electronic display. Therefore, the electronic display serves as a bridge for connecting the person and the electronic devices.

Electronic displays are classified as either an emissive display in which the optical information signal is displayed by a light-emitting way, or a non-emissive display in which the optical information signal is displayed by an optical modulation way such as light-reflecting, dispersing and interfering phenomenon, etc. As the emissive display is known as an active display, for example, they include a CRT (Cathode Ray Tube), a PDP (Plasma Display Panel), an LED (Light Emitting Diode) and an ELD (Eelectroluminescent Display), etc. As the non-emissive display is known as a passive display, they include an LCD (Liquid Crystal Display), an ECD (Electrochemical Display) and an EPID (Electrophoretic Image Display), etc.

The CRT used in an image display, such as a television receiver and a monitor, for example, has the highest market share in an aspect of displaying quality and economical efficiency, but also has many disadvantages such as heavy weight, large volume and high power consumption.

Meanwhile, due to rapid developments in semiconductor technology, various kinds of electronic devices are driven by lower voltage and lower power, and thus the electronic equipments became much slimmer and lighter. Therefore, a flat panel type display having the slimmer and lighter characteristic, as well as the lower driving voltage and lower power consumption characteristic, is required according to the new environment.

The LCD among the various developed flat panel type displays is much slimmer and lighter than any other displays, and has a lower driving voltage and lower power consumption, and also has a display quality similar to that of the CRT. Therefore, the LCD is widely used in various electronic equipments.

The LCD is classified as either a transmission type LCD for displaying an image using an external light source such as a backlight assembly, a reflection type LCD for displaying an image using natural light, and a transmissive and reflective type LCD in which the display operates in a transmission mode using an internal light source provided in the display itself when indoors or in a dark place where an external light source does not exist and the display operates in a reflection mode to display an image by reflecting an external incident light in a high brightness environment, such as outdoors.

The reflective type LCD apparatus, in general, displays an image using an external natural light or ambient light that is provided to the LCD apparatus. Therefore, the reflective type LCD apparatus may not display the image when the LCD apparatus is surrounded in darkness.

The transmissive type LCD apparatus displays an image using an artificial light that is generated from a backlight assembly internal to the LCD apparatus. Therefore, the transmissive type LCD apparatus can display the image when the LCD apparatus is surrounded in darkness. However, the transmissive type LCD apparatus has a larger power consumption than the reflective type LCD apparatus. In addition, the transmissive type LCD apparatus has a battery resulting in a heavier weight than the reflective type LCD apparatus. Therefore, the transmissive type LCD apparatus is not as desirable for use as a portable display apparatus compared with the reflective type LCD apparatus.

The LCD controls the alignment of liquid crystal molecules using a voltage applied to the liquid crystal layer, and can be classified as either a passive matrix type or an active matrix type, depending on the way the pixels are driven. In the passive matrix type, pixels are driven using a root-mean-square (rms) of a difference between voltages applied to signal lines and scanning lines while a line addressing in which a signal voltage is applied to all of the pixels at the same time is carried out. In the active matrix type, pixels are driven by a switching element such as a metal-insulator-metal (MIN) device or a thin film transistor (TFT).

FIG. 1 is a cross-sectional view showing a conventional reflective-transmissive type LCD apparatus. A portion of an artificial light, i.e., from a backlight assembly disposed at a rear side of the reflective-transmissive LCD apparatus, is lost.

Referring to FIG. 1, the reflective-transmissive LCD apparatus includes a lamp 1, a lamp reflecting plate 2, a lower polarizer 3, a retardation film 4, a reflection layer 5, a liquid crystal layer 6, a color filter 7, and an upper polarizer 8.

The lamp 1 is disposed on a backside of the lower polarizer 3 and intermediate thereof and the lamp reflecting plate 2. Lamp 1 supplies the lower polarizer 3 with an artificial light. The lower polarizer 3 has an absorption axis that is substantially perpendicular to a horizontal direction defining substantially parallel layers with respect to the reflective-transmissive LCD apparatus. When the artificial light generated from the lamp 1 is incident on the lower polarizer 3, a portion of the artificial light vibrating in the horizontal direction passes through the lower polarizer 3 and is emitted towards a viewer's side of the reflective-transmissive LCD apparatus. When the natural light that is provided from the exterior of the LCD apparatus is incident on the lower polarizer 3, a portion of the natural light vibrating in the horizontal direction passes through the lower polarizer 3 and is emitted towards the backside of the reflective-transmissive LCD apparatus.

The retardation film 4 includes a 1/4 wavelength phase ($\lambda/4$) retardation film 4. When the artificial light or the natural light passes through the λ/4 retardation film 4, a phase of the light is delayed by about 1/4 of the wavelength phase or λ/4. The 1/4 wavelength phase retardation film 4 functions to convert a linearly polarized light to a circularly polarized light, or vice versa by causing a phase difference of 1/4 wavelength between two polarization components that are normal to each other and are parallel to optical axes of the 1/4 wavelength phase retardation film 4.

The reflection layer 5 is disposed under the liquid crystal layer 6 and is intermediate the liquid crystal layer and the 1/4 wavelength phase retardation film 4 as illustrated. When a vertically polarized light is incident on the reflection layer 5, the vertically polarized light is reflected from the reflection layer 5. A luminance of the vertically polarized light is controlled by the liquid crystal layer 6. More specifically, the arrangement of the liquid crystal layer 6 varies in response to an electric field applied thereto, thus allowing a light transmittance of the liquid crystal layer 6 to be changed. A portion of the vertically polarized light that passes through the liquid crystal layer is incident on the color filter 7 and, passes through the color filter 7, dependent on a predetermined wavelength range.

The upper polarizer 8 includes a vertical polarizing axis allowing a vertically polarized light to pass through the upper polarizer 8. When the vertically polarized light that is provided from the backside is incident on the upper polarizer 8, the vertically polarized light passes through the upper polarizer 8. In addition, when the natural light or a frontal light is incident on the upper polarizer 8, the vertically polarized light passes through the upper polarizer 8 and is incident on the color filter 7.

The artificial light corresponding to the transmissive mode has a lower efficiency than an efficiency of the natural light corresponding to the reflective mode. When the reflective-transmissive LCD apparatus is in the transmissive mode, the artificial light generated from the lamp 1 is incident on the lower polarizer 3 allowing the linearly polarized light to pass through the lower polarizer 3. The linearly polarized light is incident on the retardation film 4 allowing the right circularly polarized light to be emitted from the retardation film 4. A portion of the right circularly polarized light passes through a transmission window of the liquid crystal layer 6 having a wavelength phase of the light that is changed in response to the electric field applied to the liquid crystal layer 6.

When the right circularly polarized light passes through the liquid crystal layer 6, either the right circularly polarized light or the vertically polarized light is emitted from the liquid crystal layer 6 dependent on the electric field applied to the liquid crystal layer 6. In addition, it is noted that the vertically polarized light passes through the upper polarizer 8, while the right circularly polarized light may not pass through the upper polarizer 8.

A remaining portion of the right circularly polarized light that is emitted from the retardation film 4 is reflected from the reflection layer 5 and emitted therefrom as a left circularly polarized light. The left circularly polarized light is incident on the retardation film 4 so that the vertically polarized light is emitted from the retardation film 4 toward the lower polarizer 3. The vertically polarized light is blocked by the lower polarizer 3. Therefore, the remaining portion of the artificial light is lost, thus decreasing the efficiency of the lamp.

For example, when an effective display area is about 80% and the transmission window is about 30% of the unit pixel, more than about 70% of the unit pixel is therefore lost for transmission of artificial light.

Accordingly, there is a desire to improve a luminance of a reflective-transmissive LCD apparatus by increasing the efficiency of the artificial light reflected from the reflection layer.

BRIEF SUMMARY OF THE INVENTION

Accordingly, the present invention is to solve the aforementioned problems of the conventional art, and it is an object of the present invention to provide a transmissive and reflective type LCD capable of simplifying a structure of a liquid crystal cell and decreasing light loss in the transmission mode.

A transmissive and reflective type LCD in accordance with an exemplary embodiment of the present invention includes a first substrate and a second substrate having an inner surface that is arranged so as to face the first substrate. A liquid crystal layer is formed between the first substrate and the second substrate. A first polarizing plate is formed on an outer surface of the first substrate and a backlight is arranged at a rear side of the first polarizing plate. A brightness enhancement layer is arranged between the backlight and a reflection layer disposed with one of the liquid crystal layer and the first and second substrates. The brightness enhancement layer is configured to delay a phase of the light that has passed through the brightness enhancement layer by about 1/4 phase (λ/4) so that a right circularly polarized light is emitted from the brightness enhancement layer toward a backside defining the first.

In a method of manufacturing a phase delay element in accordance with an aspect of the present invention, a liquid crystal layer is formed on an alignment layer disposed on a substrate. The liquid crystal layer is patterned and solidified to form a brightness enhancement layer. An embossed pattern is formed on the brightness enhancement layer.

A substrate in accordance with an aspect of the present invention includes an insulating plate, a switching element, a pixel electrode, a reflection layer and a brightness enhancement layer. The insulating plate includes a pixel area defined by a reflection region and a transmission window. The switching element is formed in the pixel area. The pixel electrode is electrically connected to the switching element. The reflection layer is disposed in alignment with the reflection region. The reflection layer is receptive to a front light emitted from a viewer's side outside the substrate being reflected from the reflection layer toward the viewer's side. The reflection layer is receptive to a backside light emitted from a backside of the substrate opposite the viewer's side being reflected from the reflection layer toward the backside. The brightness enhancement layer is formed intermediate the reflection layer and the backside light. The backside light is emitted from the backside toward the reflection layer through the brightness enhancement layer becomes a reflection light emitted from the reflection layer toward the backside through the brightness enhancement layer.

In a method of manufacturing a substrate in accordance with an aspect of the present invention, a switching element is formed including a pixel area, the pixel area defining a reflection region and a transmission region. A brightness enhancement layer is formed corresponding to the reflection region. The brightness enhancement layer receptive to delaying a phase of a backside light that passes through the brightness enhancement layer by about 1/4 phase (λ/4). A pixel electrode is formed in the transmission region while a reflection layer is formed in the reflection region.

An LCD apparatus in accordance with an exemplary embodiment of the present invention includes a first side, a second side opposite the first side defining the LCD apparatus, a liquid crystal layer, a first polarizer, a lower 1/4 phase (λ/4) retardation film, a brightness enhancement film and a reflection layer. The liquid crystal layer is proximate the second side and is receptive to displaying images. The first polarizer is receptive to emitting a horizontally polarized light when a light is incident on the first polarizer from either side of the first polarizer. The lower 1/4 phase (λ/4) retardation film is intermediate the liquid crystal layer and the first polarizer and is receptive to emitting a circularly polarized light when the horizontally polarized light is incident on the lower 1/4 phase (λ/4) retardation film from the first side. The horizontally polarized light is emitted from the lower 1/4 phase (λ/4) retardation film toward the first side when the circularly polarized light is incident on the lower 1/4 phase (λ/4) retardation film from the second side. The brightness enhancement film is intermediate the liquid crystal layer and the 1/4 phase (λ/4) retardation film and is receptive to emitting a vertically polarized light therefrom toward the second side when the circularly polarized light is incident on the brightness enhancement film from the first side. The brightness enhancement film is also receptive to emitting a circularly polarized light therefrom when the vertically polarized light is incident on the brightness enhancement film from the second side. The reflection layer is intermediate the liquid crystal layer and the brightness enhancement film and is receptive to reflecting the vertically polarized light to the brightness enhancement film, the vertically polarized light being incident on the reflection layer from the first side A phase delay element for a LCD apparatus in accordance with an exemplary embodiment of the present invention includes a brightness enhancement layer disposed between a backlight and a reflection layer. The brightness enhancement layer is defined by a bottom member and a counter member, the counter member being integrally formed with the bottom member. The counter member is disposed facing the reflection layer, wherein a first light having a wavelength phase (λ) incident on the bottom member is delayed by about 1/4 phase (λ/4) emitting a second light from the counter member toward the reflection layer. The second light is reflected from the reflection layer to become a third light that is emitted from the reflection layer toward the counter member. A phase of the third light is delayed by about 1/4 phase (λ/4) passing through the brightness enhancement layer emitting a fourth light from the bottom member.

Therefore, the LCD apparatus includes the 1/4 phase (λ/4) retardation film so that a portion of the artificial light, which is reflected from the reflection layer, is used to improve a luminance of the LCD apparatus.

The present application claims priority from Korean Patent Application No. 2004-55827, filed on Jul. 19, 2004, the disclosure of which is hereby incorporated herein by reference in its entirety.

BRIEF DESCRIPTION OF THE DRAWINGS

The above and other advantages of the present invention will become more apparent by describing in detail exemplary embodiments thereof with reference to the accompanying drawings, in which:

FIG. 8 is a cross-sectional view showing an LCD apparatus in accordance with an exemplary embodiment of the present invention;

FIGS. 9A to 9E are cross-sectional views showing a method of manufacturing an array substrate shown in FIG. 8;

DESCRIPTION OF THE EXEMPLARY EMBODIMENTS

It should be understood that the exemplary embodiments of the present invention described below may be varied or modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not by way of limitation.

Figure 1:
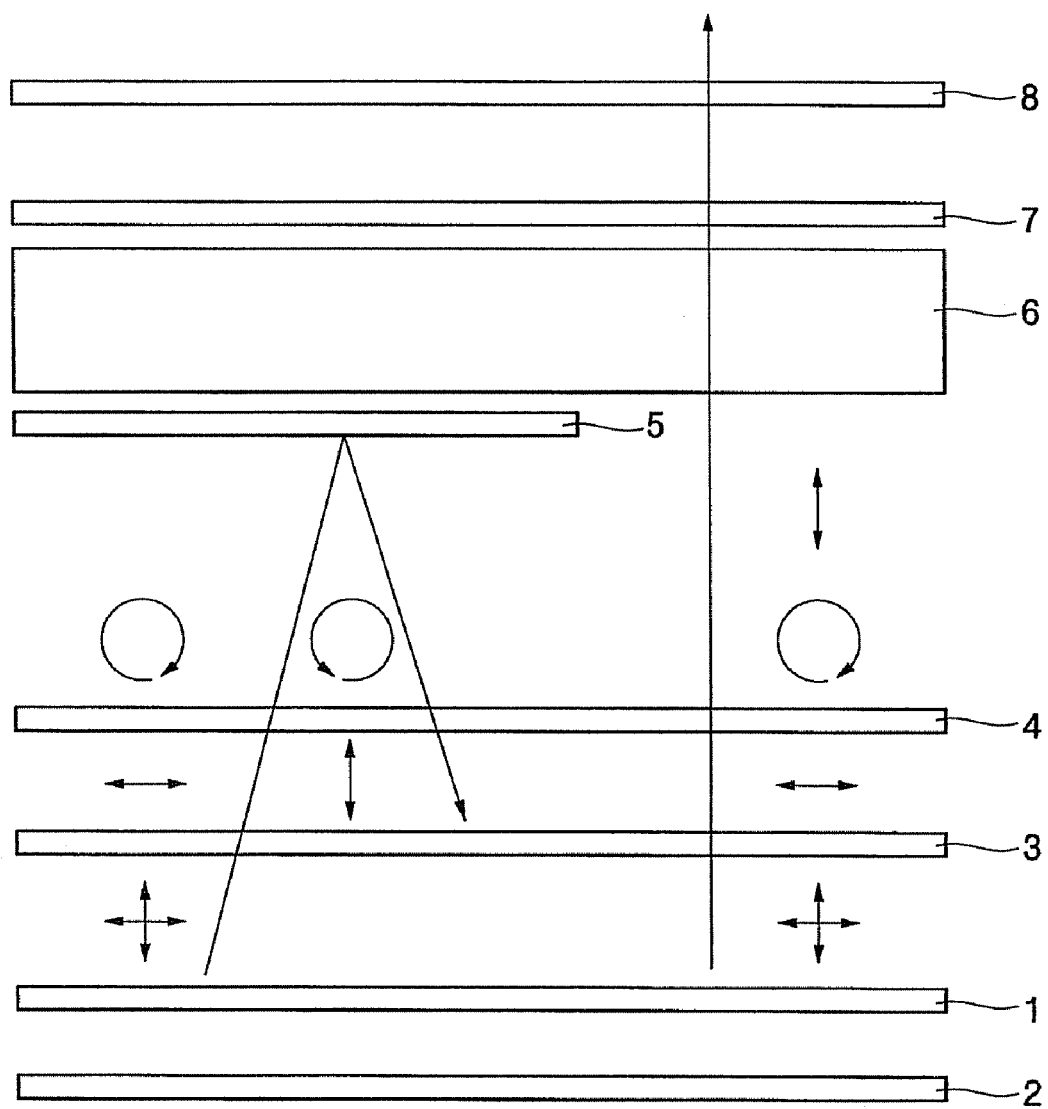
FIG. 1 is a cross-sectional view showing a conventional reflective-transmissive LCD apparatus.
Figure 2:
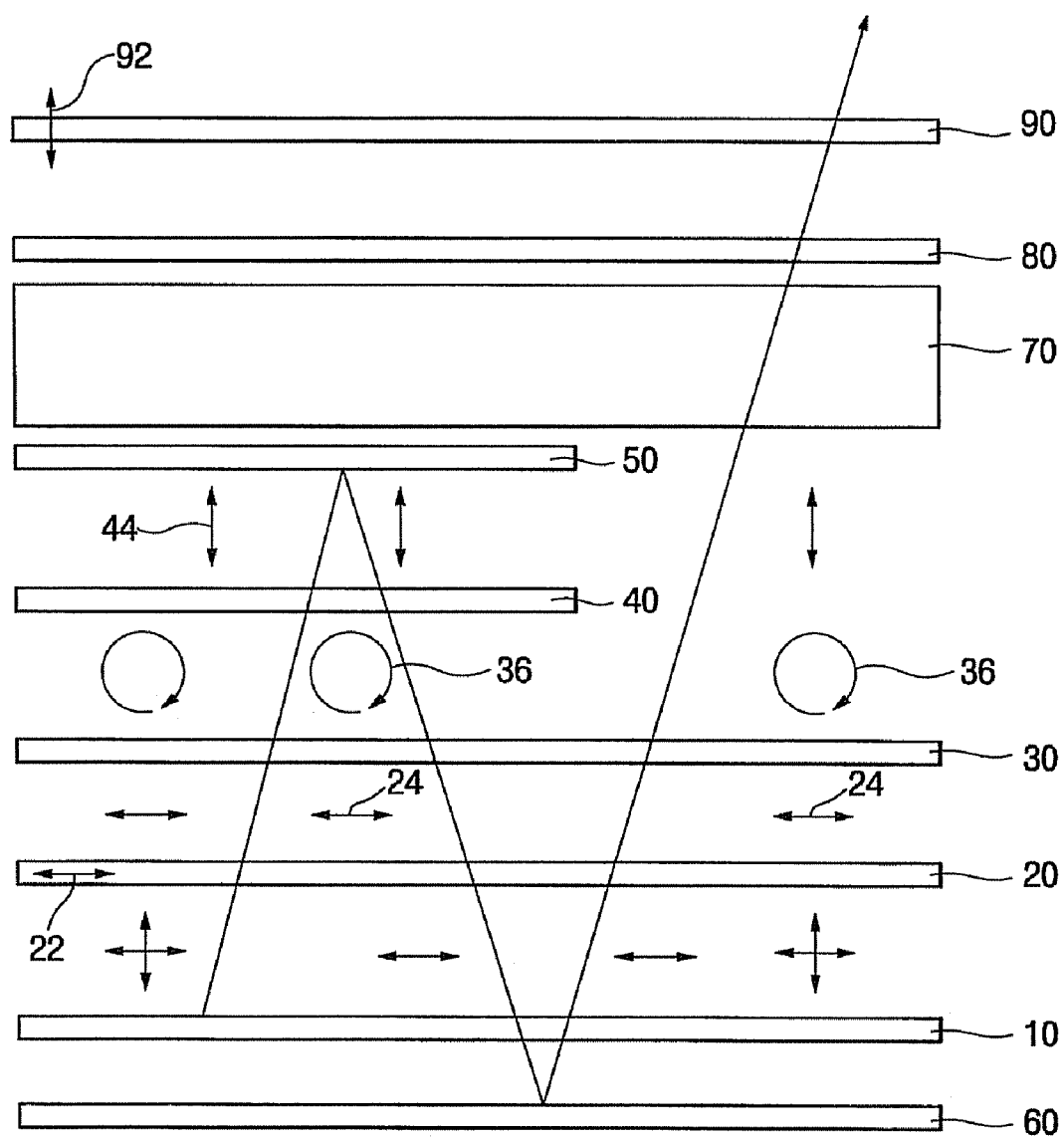
FIG. 2 is a cross-sectional view showing an LCD apparatus in accordance with an exemplary embodiment of the present invention.

Referring to FIG. 2, a cross section view of an LCD apparatus is illustrated in accordance with an exemplary embodiment. The LCD apparatus includes a lamp 10, a lower polarizer 20, a retardation film 30, a brightness enhancement layer 40, a reflection layer 50, a lamp reflecting plate 60, a liquid crystal layer 70, a color filter 80 and an upper polarizer 90. In one embodiment, the upper polarizer 90 may be an analyzer. A viewer's side of the LCD apparatus corresponds to an upper portion or a top side of the LCD apparatus as illustrated. A backside of the LCD apparatus corresponds to a lower portion of the LCD apparatus as illustrated.

The lamp 10 is disposed under the lower polarizer 20, as illustrated, or is intermediate the lamp polarizer 20 and the lamp reflecting plate 60. Lamp 10 is configured to generate an artificial light that is a non-polarized light.

The lower polarizer 20 includes a horizontal polarizing axis indicated generally with arrow 22. When the artificial light is incident on the lower polarizer 20 from the backside, a horizontally polarized light is emitted from the lower polarizer 20 toward the viewer's side indicated generally with double-ended arrows 24. When the horizontally polarized light 24 is incident on the lower polarizer 20 from the viewer's side, the horizontally polarized light 24 is emitted from the lower polarizer 20 toward the backside. In this manner, the horizontally polarized light 24 is allowed to pass through the lower polarizer 20 from either side.

A phase of a wavelength of light that has passed through the retardation film 30 is delayed by about 1/4 phase or λ/4. When the horizontally polarized light 24 is incident on the retardation film 30 from the backside, a phase of the horizontally polarized light 24 is delayed by about 1/4 phase (λ/4), thus emitting a right circularly polarized light indicated generally at 36 from the retardation film 30 towards the viewer's side. When the right circularly polarized light 36 is incident on the retardation film 30 from the viewer's side, the horizontally polarized light 24 is emitted from the retardation film 30 toward the backside.

A phase of the light that has passes through the brightness enhancement layer 40 is delayed by about 1/4 phase (λ/4). When the right circularly polarized light 36 is incident on the brightness enhancement layer 40 from the backside, a phase of the right circularly polarized 36 light is delayed by about 1/4 phase (λ/4), thus emitting a vertically polarized light from the bright enhancement layer 40 toward the viewer's side indicated generally at 44. When a reflected vertically polarized light 36 that is reflected from the reflection layer 50 is incident on the brightness enhancement layer 40 from the viewer's side, a phase of the reflected vertically polarized light is delayed about 1/4 phase (λ/4) emitting the right circularly polarized light 36 from the brightness enhancement layer 40 toward the backside.

In an exemplary embodiment, the brightness enhancement layer 40 includes a birefringent film, an alignment film of a liquid crystal polymer, and an alignment layer of the liquid crystal polymer that is fixed using a film, for example. A polymer film may be extended in a predetermined direction to form the birefringent film. The polymer film may include polycarbonate, polyvinylalcohol, polystyrene, polymethylmethacrylate, polypropylene, polyolefin, polyacrylate, polyamide, for example, but is not limited thereto.

Figure 3:
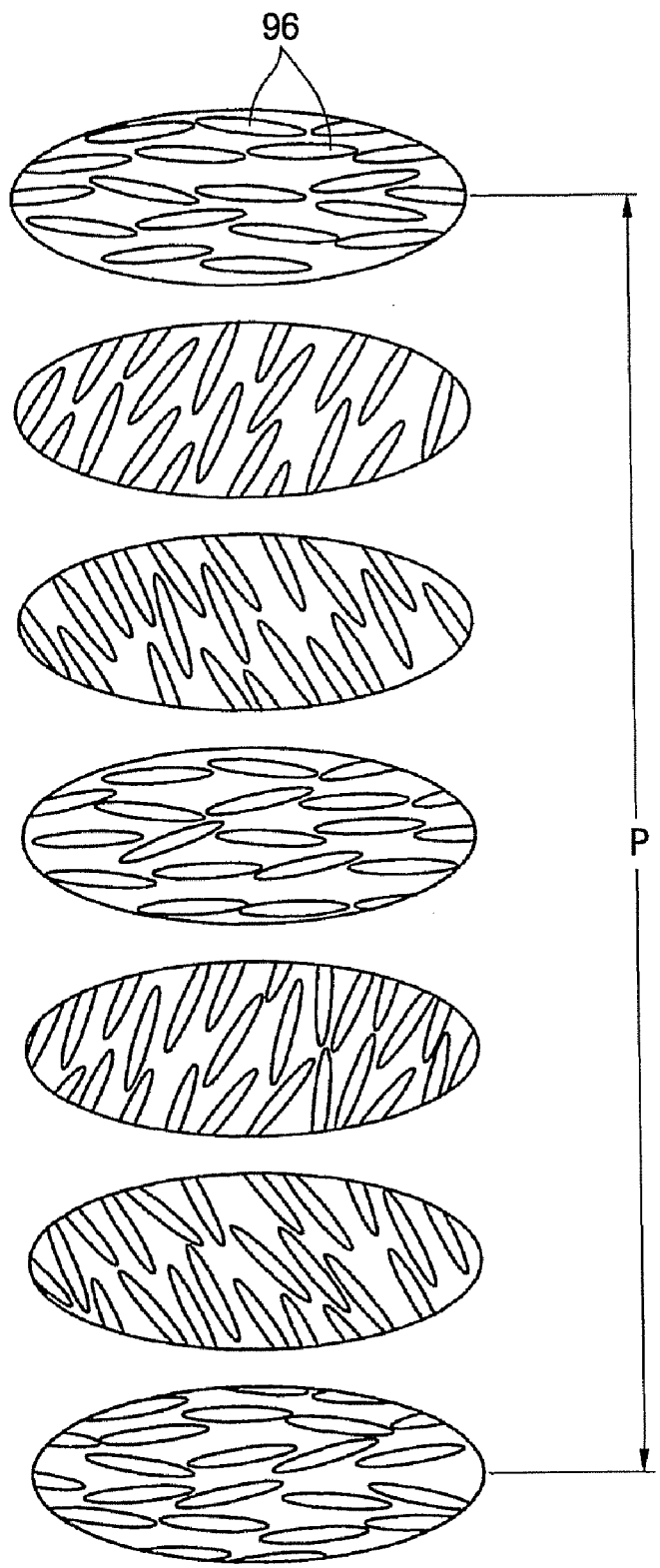
FIG. 3 is a plan view showing a molecular structure of a cholesteric liquid crystal in accordance with an exemplary embodiment of the present invention.

In one exemplary embodiment referring to FIG. 3, the brightness enhancement layer 40 includes a cholesteric liquid crystal that is an ultraviolet curable liquid crystal polymer. FIG. 3 illustrates a plan view showing a molecular structure of a cholesteric liquid crystal. Directions of molecules 96 of the cholesteric liquid crystal are gradually changed along a spiral axis (not shown) having a pitch (P). The spiral axis corresponds to a direction of the light that passes through the cholesteric liquid crystal. In particular, a portion of a nematic liquid crystal is changed to have a chiral structure that has a spiral shape, thereby forming the liquid crystal. One layer of the cholesteric liquid crystal is substantially identical to a plan view of the nematic liquid crystal, however, the nematic liquid crystal does not have the spiral axis.

Referring again to FIG. 2, the reflection layer 50 is disposed under the liquid crystal layer 70 as illustrated or is intermediate the liquid crystal layer and brightness enhancement layer 40. When the vertically polarized light 44 is reflected from the reflection layer 70, the phase of the vertically polarized light is not changed.

The lamp reflecting plate 60 is disposed under the lamp 10 and defines the backside of the LCD apparatus. When the artificial light generated from lamp 10 or the vertically polarized light 44 from the viewer's side is incident on the lamp reflecting plate 60, the artificial light is reflected from the lamp reflecting plate 60 toward the viewer's side without change to the phase of the artificial light. The reflected vertically polarized light then consequently passes through the bright enhancement layer 40, the retardation film 30 and the lower polarizer 20.

The liquid crystal layer 70 controls the phase of the vertically polarized light 44 that is provided from the backside based on an electric field applied to the liquid crystal layer 70 and emitting a light incident on the color filter 80 having the changed phase. Therefore, a light transmittance of the liquid crystal layer 70 may be changed. A thickness of the liquid crystal layer 70 is referred to as a cell gap. The cell gap of the liquid crystal layer 70 corresponding to the reflection region may be different from the cell gap of the liquid crystal layer 70 corresponding to the transmission region. In this exemplary embodiment, the cell gap of the reflection region is about a half of the cell gap of the transmission region.

A portion of the vertically polarized light 44 that has passed through the liquid crystal layer 70, which has a predetermined wavelength range, passes through a corresponding portion of the color filter 80. More specifically, the color filter 80 includes a red color filter portion, a green color filter portion and a blue color filter portion. For example, a red light having about 650 nm of the wavelength is allowed to pass through the red color filter portion. A green light having about 550 nm of the wavelength is allowed to pass through the green color filter portion. A blue light having about 450 nm of the wavelength is allowed to pass through the blue color filter portion. In this exemplary embodiment, the color filter 80 is disposed on the liquid crystal layer 70 as illustrated, or is intermediate the liquid crystal layer 70 and the upper polarizer 90. Alternatively, the color filter 80 may be disposed under the liquid crystal layer 70 being intermediate thereof and the reflection layer 50.

The upper polarizer 90 includes a vertically polarizing axis 92. When a light is incident on the upper polarizer 90 from the backside, a vertically polarized light is emitted from the upper polarizer 90 toward the viewer's side. When a natural light or a front light is incident on the upper polarizer 90 from the viewer's side, the vertically polarized light is emitted from the upper polarizer 90 and is incident on the color filter 80. In this exemplary embodiment, the polarizing axis 92 of the upper polarizer 90 is substantially perpendicular to the polarizing axis 22 of the lower polarizer 20. The natural light may include sunlight or an illumination light from a front, for example, but is not limited thereto. Further, the front light may be an artificial light generated from an auxiliary lamp (not shown) disposed on a viewer's side of the LCD apparatus. Still referring to FIG. 2, the overall operation of the brightness enhancement layer 40 will now be described herein below. When the artificial light generated from the lamp 10 is incident on the lower polarizer 20, the horizontally polarized light 24 is emitted from the lower polarizer 20 toward the retardation film 30. When the horizontally polarized light 24 is incident on the retardation film 30, the right circularly polarized light 36 is emitted from the retardation film 30 toward the brightness enhancement layer 40. When the right circularly polarized light 36 is incident on the brightness enhancement layer 40, the vertically polarized light 44 is emitted from the brightness enhancement layer 40 toward the reflection layer 50. The vertically polarized light 44 is reflected from the reflection layer 50 so that the reflected light is incident on the brightness enhancement layer 40. The vertically polarized light 44 may be reflected and scattered. The linearly polarized light (e.g., horizontally and vertically polarized lights 24 and 44, respectively) is a P-wave, and the circularly polarized light 36 is a S-wave.

When the reflected light from the reflection layer 50 is incident on the brightness enhancement layer 40, the right circularly polarized light 36 is emitted from the brightness enhancement layer 40 toward the retardation film 30. When the right circularly polarized light 36 is incident on the retardation film 30, the horizontally polarized light 24 is emitted from the retardation film 30. The horizontally polarized light 24 passes through the lower polarizer 20, and the horizontally polarized light 24 is reflected from the lamp reflecting plate 60. The reflected horizontally polarized light is incident on the lower polarizer 20, thus increasing a luminance of the LCD apparatus.

In this exemplary embodiment, the brightness enhancement layer 40 is disposed in the reflection region. Alternatively, the brightness enhancement layer may be disposed in the reflection region and the transmission region.

In another exemplary embodiment, the brightness enhancement layer 40 may be disposed in the liquid crystal layer 70. The brightness enhancement layer may also be disposed on a lower substrate of the LCD apparatus using a film.

The cell gap of the liquid crystal layer 70 is determined by an anisotropy of the reflective index $\Delta n$. In this exemplary embodiment, the cell gap of the transmission region of the liquid crystal layer 70 is about 4 μm to about 6 μm, and the cell gap of the reflection region of the liquid crystal layer 70 is about 2 μm to about 3 μm. Referring to FIG. 2, the brightness enhancement layer 40 may constitute about 2 μm to about 3 μm of the 1/4 phase ($\lambda/4$) retardation film 30. A polycarbonate is extended in a predetermined direction to form the 1/4 phase ($\lambda/4$) retardation film 30. The 1/4 phase ($\lambda/4$) retardation film 30 may also be formed by aligning the liquid crystal.

The 1/4 phase ($\lambda/4$) retardation film 30 having the extended polycarbonate may have about 0.001 of the anisotropy of the reflective index $\Delta n$. When the anisotropy of the reflective index $\Delta n$ and a reference wavelength are about 0.001 and about 560 nm, respectively, the thickness of the 1/4 phase ($\lambda/4$) retardation film 30 corresponding to a light having a wavelength of about 140 nm may be 140 μm.

The 1/4 phase ($\lambda/4$) retardation film 30 having the aligned liquid crystal may have about 0.1 of the anisotropy of the reflective index $\Delta n$. When the anisotropy of the reflective index $\Delta n$ and a reference wavelength are about 0.1 and about 560 nm, respectively, the thickness of the 1/4 phase ($\lambda/4$) retardation film 30 corresponding to a light having a wavelength of about 140 nm may be 1.4 μm.

FIGS. 4A to 4F are cross-sectional views illustrating a method of manufacturing a brightness enhancement layer 40 in accordance with an exemplary embodiment of the present invention.

Figure 4A:
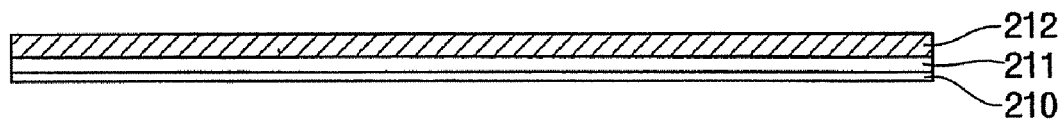
FIGS. 4A to 4F are cross-sectional views showing a method of manufacturing a brightness enhancement layer in accordance with an exemplary embodiment of the present invention.

Referring to FIG. 4A, an alignment film 211 is formed on a substrate film 210 for printing. An ultraviolet curable liquid crystal polymer is coated on the alignment film 211 to form an aligned liquid crystal layer 212. The ultraviolet curable liquid crystal polymer may include the cholesteric liquid crystal illustrated in FIG. 3.

Figure 4B:
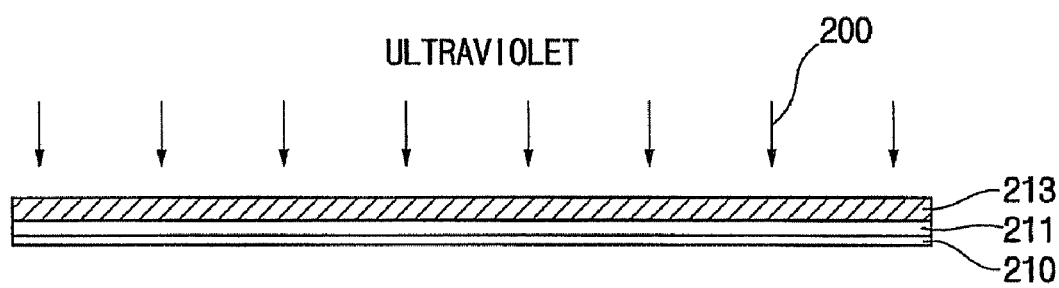

Referring to FIG. 4B, an ultraviolet light indicated generally with rays 200 is irradiated on the aligned liquid crystal layer 212 to form a semi-solid liquid crystal layer 213. The semi-solid liquid crystal layer 213 may be a biaxial film or a uniaxial film. For example, a polarized ultraviolet light may be irradiated on the cholesteric liquid crystal to form the biaxial film. A non-polarized ultraviolet light may be irradiated on the cholesteric liquid crystal to form a C-plate. A "C-plate" denotes a birefringent optical element, such as, for example, a plate or film, with a principle optical axis (often referred to as the "extraordinary axis") substantially perpendicular to the selected surface of the optical element. The principle optical axis corresponds to the axis along which the birefringent optical element has an index of refraction different from the substantially uniform index of refraction along directions normal to the principle optical axis.

The biaxial film has an x-refractive index (nx), a y-refractive index (ny), and a z-refractive index (nz) that are different from one another. The uniaxial film includes an A-plate and the C-plate. An "A-plate" denotes a birefringent optical element, such as, for example, a plate or film, having its principle optical axis within the x-y plane of the optical element. Positively birefringent a-plates can be fabricated using, for example, uniaxially stretched films of polymers such as, for example, polyvinyl alcohol, or uniaxially aligned films of nematic positive optical anisotropy LCP materials. Negatively birefringent a-plates can be formed using uniaxially aligned films of negative optical anisotropy nematic LCP materials, including for example discotic compounds. A y-refractive index of the A-plate is substantially equal to a z-refractive index of the A-plate, and the y-refractive index of the A-plate is smaller than a z-refractive index of the A-plate. A x-refractive index of the C-plate is substantially equal to a y-refractive index of the C-plate, and the y-refractive index of the C-plate is larger than a z-refractive index of the C-plate.

Figure 4C:
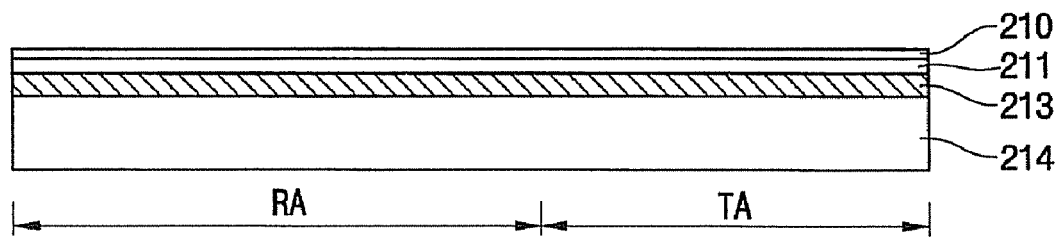

Referring to FIG. 4C, the semi-solid liquid crystal layer 213 is disposed on a glass plate 214. The glass plate 214 includes a reflection region or reflection area (RA) and a transmission region or transmission area (TA). The semi-solid liquid crystal layer 213 is heated or compressed to fix the semi-solid liquid crystal layer 213 to the glass plate 214.

Figure 4D:
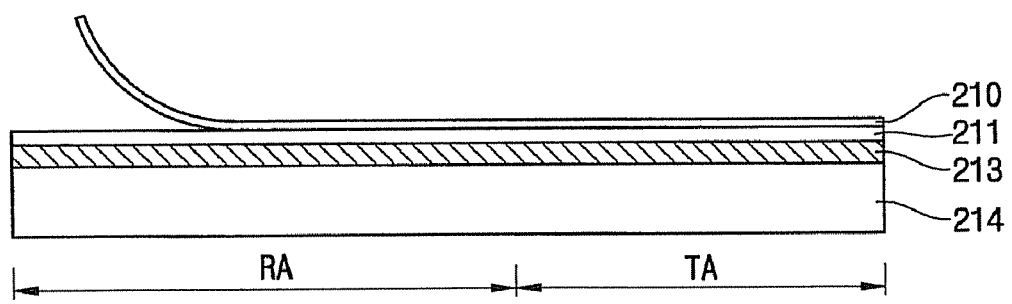

Referring to FIG. 4D, the substrate film 210 for printing is then detached from the alignment film 211 forming the semi-solid liquid crystal layer 213 on the glass plate 214.

Figure 4E:
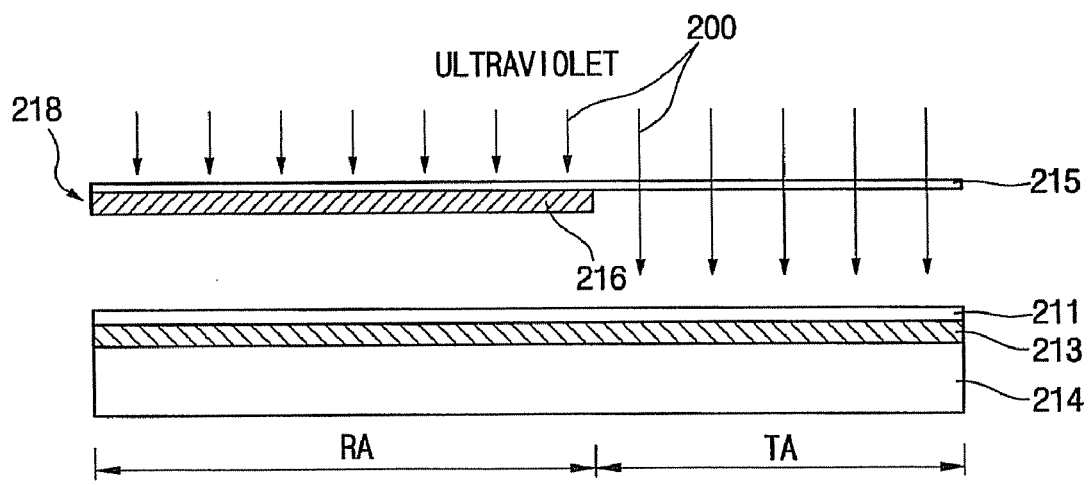

Referring to FIG. 4E, a reticle 218 having a transparent plate 215 and an opaque pattern 216 is aligned over the glass plate 214. The opaque pattern 216 corresponds to the reflection region RA and is aligned therewith. Alternatively, the opaque pattern 216 may correspond to and be aligned with the transmission region TA. When the ultraviolet light 200 is irradiated on the semi-solid liquid crystal layer 213 through the reticle 218 during a developing process, the semi-solid liquid crystal layer 213 is developed. Therefore, a portion of the semi-solid liquid crystal layer 213 corresponding to the reflection region RA is solidified, and a remaining portion of the semi-solid liquid crystal layer 213, corresponding to the transmission region TA, is removed. The alignment film 211 is also removed during the developing process.

Figure 4F:
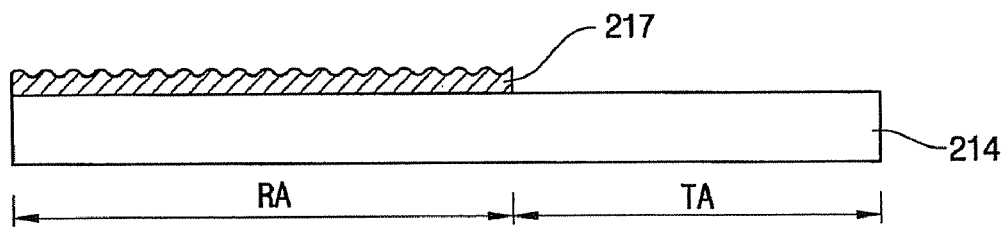

Referring to FIG. 4F, a brightness enhancement layer 217 is illustrated as being an embossed pattern formed on an exposed surface of the solidified liquid crystal layer disposed in the reflection region RA.

FIGS. 5A to 5E are cross-sectional views illustrating a method of manufacturing a brightness enhancement layer in accordance with another exemplary embodiment of the present invention.

Figure 5A:
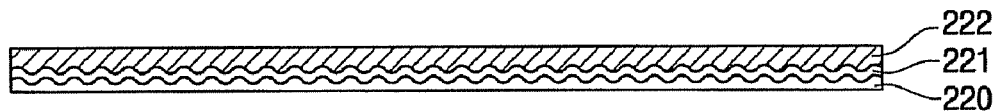
FIGS. 5A to 5E are cross-sectional views showing a method of manufacturing a brightness enhancement layer in accordance with another exemplary embodiment of the present invention.

Referring to FIG. 5A, an alignment layer 221 is formed on a photoresist film 220 having an embossed pattern. A liquid crystal layer 222 is formed on the alignment layer 221 such that the alignment layer 221 is intermediate the photoresist film 220 and the liquid crystal layer 222.

Figure 5B:
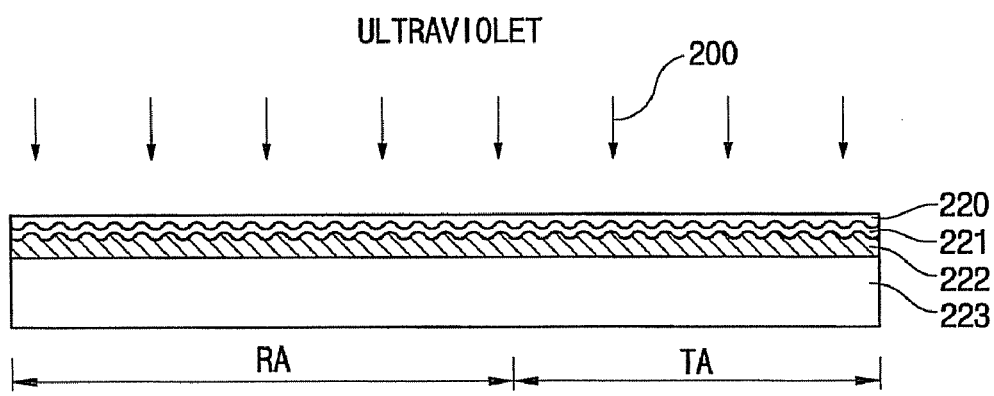

Referring to FIG. 5B, an exposed surface of the liquid crystal layer 222 is then disposed to a glass plate 223. An ultraviolet light 200 is irradiated on the liquid crystal layer 222 to semi-solidify the liquid crystal layer 222, which may be a biaxial film or a uniaxial film. For example, a polarized ultraviolet light may be irradiated on a cholesteric liquid crystal of the liquid crystal layer 222 to form the biaxial film.

Alternatively, a non-polarized ultraviolet light may be irradiated on the cholesteric liquid crystal to form a C-plate.

Figure 5C:
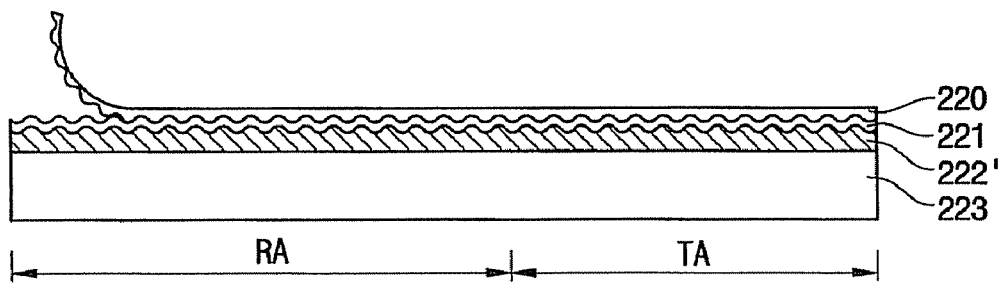

Referring to FIG. 5C, the photoresist film 220 is illustrated as being removed from the alignment layer 221.

Figure 5D:
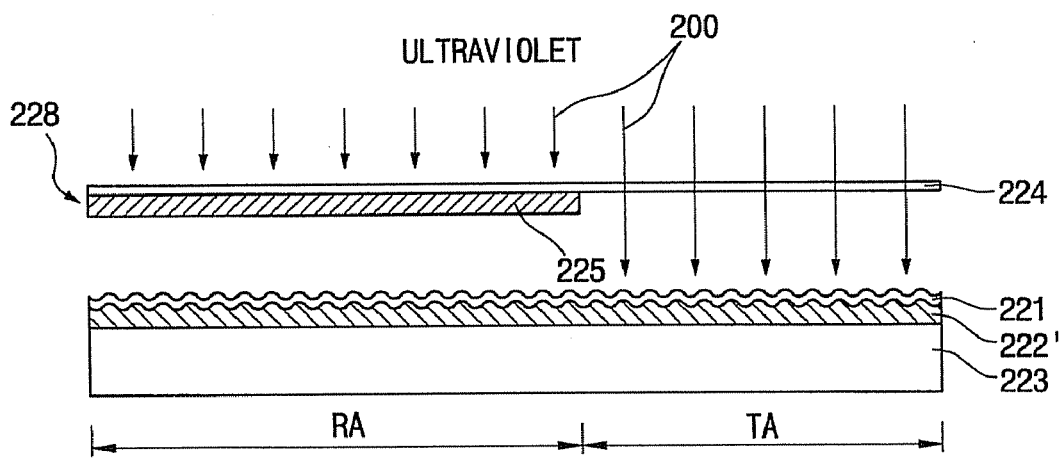

Referring to FIG. 5D, a reticle 228 having a transparent plate 224 and an opaque pattern 225 is disposed over the alignment layer 221. The opaque pattern 225 corresponds to and is aligned with the reflection region RA. Alternatively, the opaque pattern 225 may correspond to the transmission region TA. When the ultraviolet light 200 is irradiated on the semi-solid liquid crystal layer 222' through the reticle, the semi-solid liquid crystal layer 222' is developed. Therefore, a portion of the semi-solid liquid crystal layer 222' corresponding to the reflection region RA is then solidified, and a remaining portion of the semi-solid liquid crystal layer 222', corresponding to the transmission region TA, is removed. The alignment film 221 is also removed during this developing process.

Figure 5E:
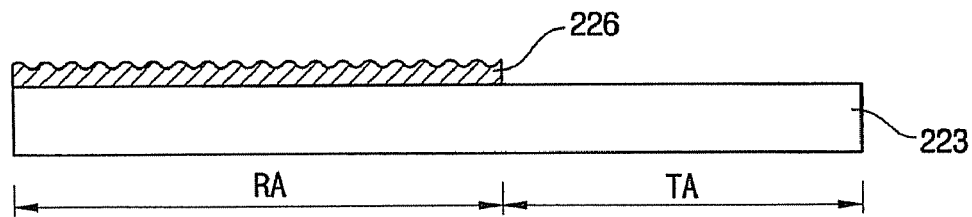

FIG. 5E illustrates a completed brightness enhancement layer 226 having the embossed pattern on an exposed surface thereof.

FIGS. 6A to 6F are cross-sectional views illustrating another method of manufacturing a brightness enhancement layer in accordance with another exemplary embodiment of the present invention.

Figure 6A:
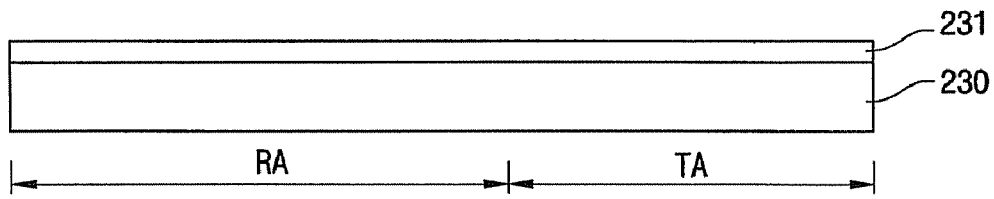
FIGS. 6A to 6F are cross-sectional views showing a method of manufacturing a brightness enhancement layer in accordance with another exemplary embodiment of the present invention.
Figure 6B:
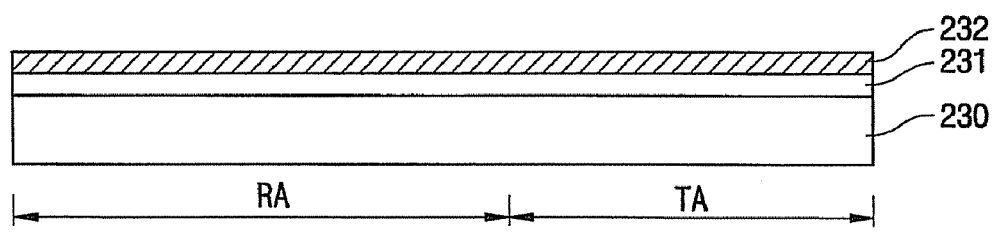

Referring to FIGS. 6A and 6B, an alignment layer 231 is formed on a plate 230 having a reflection region (RA) and a transmission region (TA). A liquid crystal layer 232 is formed on the alignment layer 231, which is intermediate the liquid crystal layer 232 and the plate 230.

Figure 6C:
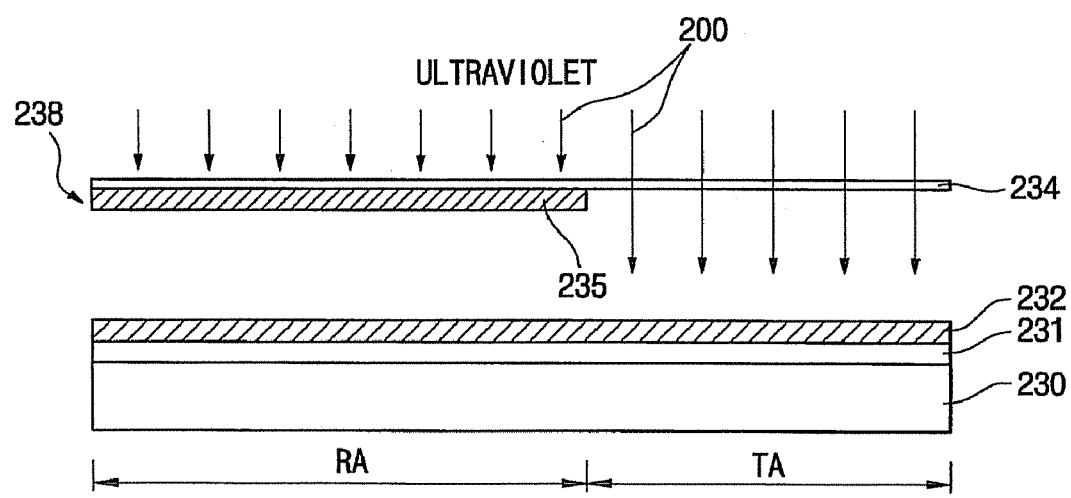
Figure 6D:
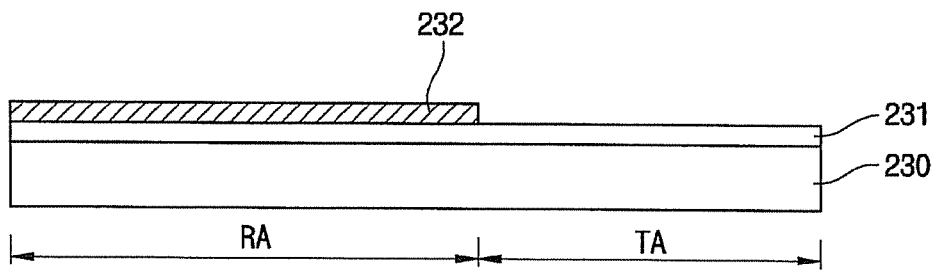

Referring to FIG. 6C, a reticle 238 having a first transparent plate 234 and an opaque pattern 235 is disposed over the plate 230, as illustrated. The opaque pattern 235 corresponds to and is aligned with the reflection region RA. Alternatively, the opaque pattern 235 may correspond to the transmission region TA. When the ultraviolet light 200 is irradiated on the liquid crystal layer 232 through the reticle, the liquid crystal layer 232 is developed. Therefore, a portion of the liquid crystal layer 232 corresponding to the reflection region RA is solidified, and a remaining portion of the liquid crystal layer 232 corresponding to the transmission region TA is removed. The alignment film 231 may not be removed during this developing process. FIG. 6D illustrates a completed brightness enhancement layer pattern 232 formed through the developing process.

Figure 6E:
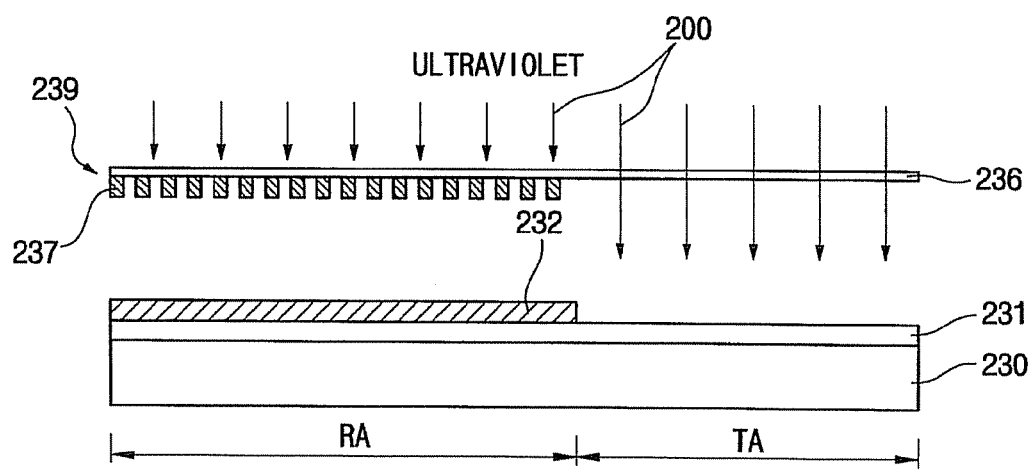
Figure 6F:
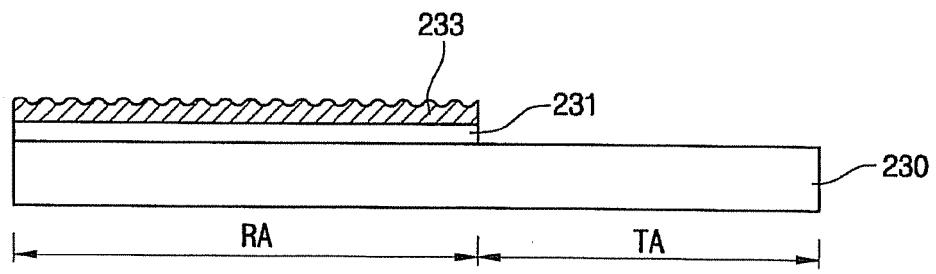

Referring to FIG. 6E, a reticle 239 having a second transparent plate 236 and a plurality of opaque members 237 is disposed over the plate 230. The opaque members 237 correspond to and are aligned with the reflection region RA. When the ultraviolet light 200 is irradiated on the liquid crystal layer 232 through the reticle 239, the liquid crystal layer 232 is developed. Therefore, an embossed pattern is formed on an exposed surface of the brightness enhancement layer pattern 232 forming a brightness enhancement layer 233 (see FIG. 6F). FIG. 6F also illustrates an absence of a portion of the alignment film 231 corresponding to and aligned with the transmission region TA that has been removed.

FIGS. 7A to 7E are cross-sectional views illustrating another method of manufacturing a brightness enhancement layer in accordance with another exemplary embodiment of the present invention.

Figure 7A:
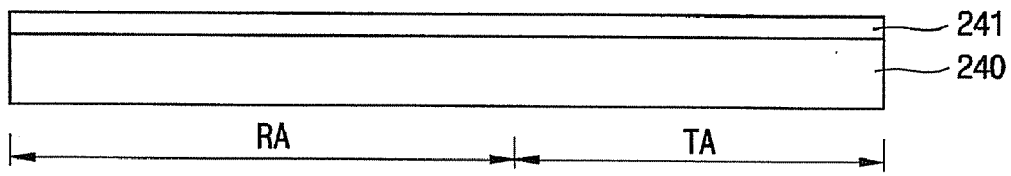
FIGS. 7A to 7E are cross-sectional views showing a method of manufacturing a brightness enhancement layer in accordance with another exemplary embodiment of the present invention.

Referring to FIG. 7A, a photoresist alignment layer 241 is formed on a plate 240 having a reflection region RA and a transmission region TA.

Figure 7B:
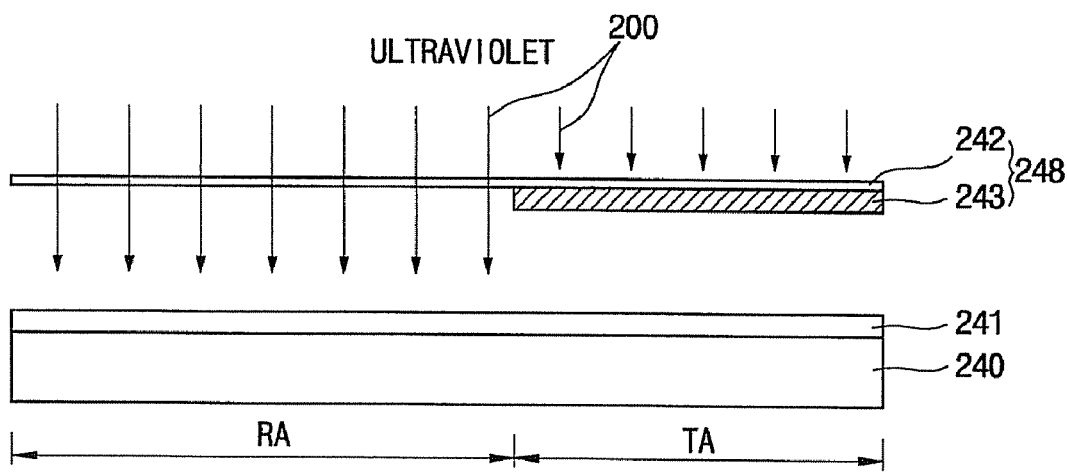

Referring to FIG. 7B, a reticle 248 having a transparent plate 242 and an opaque pattern 243 is disposed over the plate 240. The opaque pattern 243 corresponds to and is aligned with the transmission region TA. Alternatively, the opaque pattern 243 may correspond to and be aligned with the reflection region RA. When ultraviolet light 200 is irradiated on the photoresist alignment layer 241 through the reticle 248, the photoresist alignment layer 241 is developed. Therefore, a portion of the photoresist alignment layer 241 corresponding to the reflection region RA is removed, and a remaining portion of the photoresist alignment layer 241 corresponding to the transmission region TA is solidified.

Figure 7C:
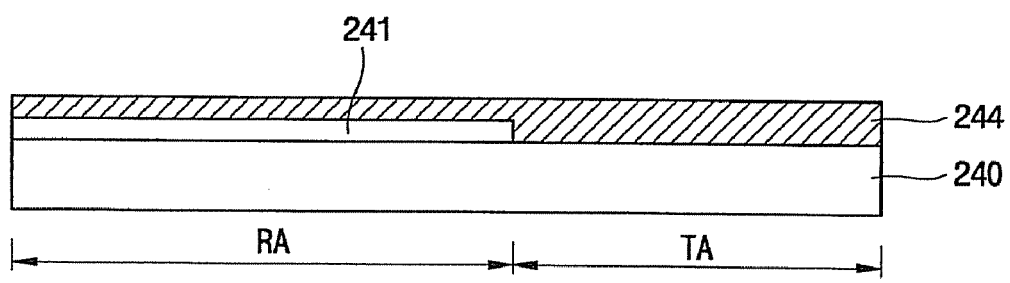

Referring to FIG. 7C, a liquid crystal layer 244 is then formed over the plate 240 having the photoresist alignment layer 241 corresponding to and aligned with the reflection region RA.

Figure 7D:
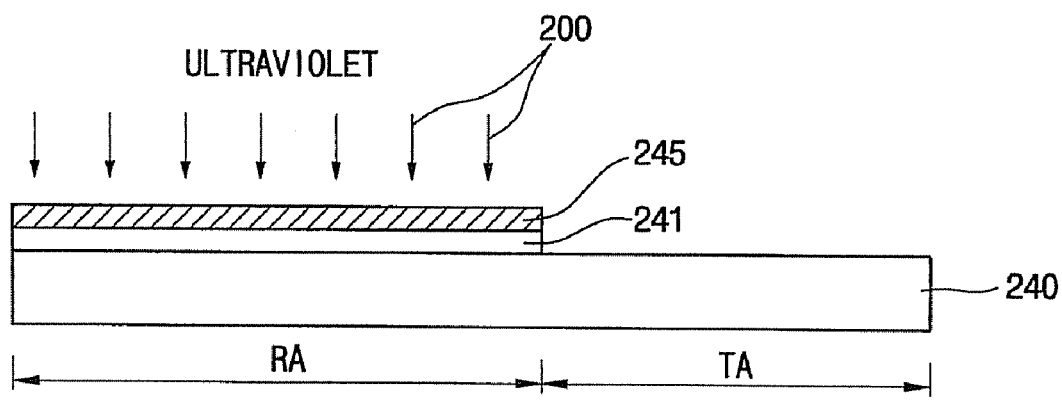

Referring to FIG. 7D, the ultraviolet light 200 is shown selectively irradiated on a portion of the liquid crystal layer 244 in the reflection region RA, thereby developing the liquid crystal layer 244. The ultraviolet light 200 may be irradiated on the liquid crystal layer 244 through a reticle (not shown). After selective irradiation in the reflection region RA, a portion of the liquid crystal layer 244 corresponding to the transmission region TA is removed. A remaining portion of the liquid crystal layer 244 corresponding to the reflection region RA is solidified, thereby forming a brightness enhancement layer pattern 245.

Figure 7E:
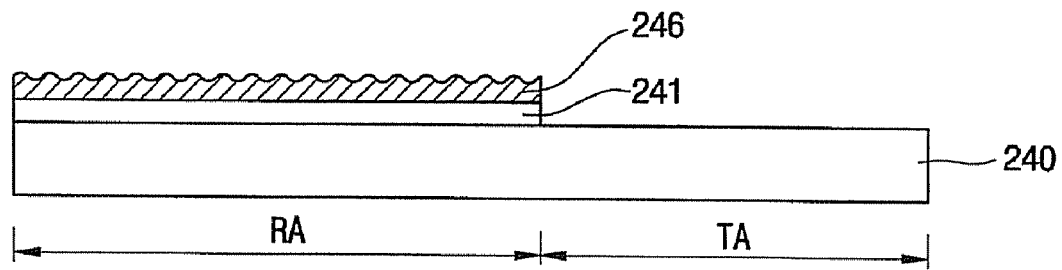

Referring to FIG. 7E, an embossed pattern is formed on an exposed surface of the brightness enhancement layer pattern 245 forming a completed brightness enhancement layer 246.

Referring to FIG. 8 a cross-sectional view of an LCD apparatus in accordance with an exemplary embodiment of the present invention is illustrated. The LCD apparatus includes a reflective-transmissive array substrate having a top transparent conductive oxide such as indium tin oxide (ITO). In this embodiment, a brightness enhancement layer is formed on an organic insulating layer corresponding to a reflection region.

The LCD apparatus includes an array substrate 100, a color filter substrate 200, a liquid crystal layer 300 disposed between the array substrate 100 and the color filter substrate 200, a lower film assembly 410 and an upper film assembly 420. The lower film assembly 410 and an upper film assembly 420 are disposed at opposite ends of the LCD apparatus proximate a backside and a topside thereof, respectively.

The array substrate 100 includes a lower transparent plate 105, a thin film transistor (TFT) disposed on the lower transparent plate 105, an organic insulating layer 140, a brightness enhancement layer 150, a pixel electrode 160 and a reflection layer 170, disposed in ascending order as illustrated. The TFT includes a gate electrode 110 formed on the lower transparent plate 105, a gate insulating layer 112 formed on the lower transparent plate 105 having the gate electrode 110, a semiconductor layer 114, an ohmic contact layer 116, a source electrode 120, and a drain electrode 130. The organic insulating layer 140 is disposed over the TFT. The drain electrode 130 and the gate insulating layer 112 corresponding to the reflection region are partially exposed through a contact hole 141 and an opening of the organic insulating layer 140, respectively.

The brightness enhancement layer 150 is formed on the organic insulating layer 140 and has an uneven thickness or a non-planar surface. In one embodiment, convex and concave portions may be formed along a length on the organic insulating layer 140 defining the uneven thickness or non-planar surface. Alternatively, the brightness enhancement layer 150 may be formed on the organic insulating layer having an even thickness. In the exemplary embodiment illustrated in FIG. 8, the brightness enhancement layer 150 has an embossed pattern. Therefore, when a light that passes through the brightness enhancement layer 150 is reflected from the reflection layer 170 and passes through the brightness enhancement layer 150 toward the backside of the LCD apparatus, the light passes through various light paths as a result of the uneven brightness enhancement layer 150 having various optical characteristics Δnd. The various optical characteristics And is a product of a refractive anisotropy Δn and a thickness d of the liquid crystal layer.

The pixel electrode 160 is formed over the brightness enhancement layer 150 such that a portion of the enhancement layer is exposed through the opening of the brightness enhancement layer 150, the organic insulating layer 140, and the contact hole 141 allowing electrical connection between the pixel electrode 160 and the drain electrode 130 of the TFT. In this exemplary embodiment, the pixel electrode 160 is electrically connected to the drain electrode 130 of the TFT through the contact hole 141. The reflection layer 170 is formed on the pixel electrode 160 and corresponds to the reflection region. A transmission window is defined by an absence of the reflection layer 170.

The pixel electrode 160 is a transparent electrode that includes a conductive oxide film such as indium tin oxide (ITO), tin oxide (TO), indium zinc oxide (IZO), zinc oxide (ZO), and the like, for example. A capacitor line (not shown) may be formed between the organic insulating layer 140 and the pixel electrode 160 in a region spaced apart from the TFT so that the capacitor line and a portion of the pixel electrode 160 form a storage capacitor $C_{st}$. In this exemplary embodiment illustrated in FIG. 8, the reflection layer 170 is formed on the pixel electrode 160. In an alternative embodiment, an insulating layer may be disposed between the reflection layer 170 and the pixel electrode 160.

The color filter substrate 200 intermediate the liquid crystal layer 300 and the upper film assembly 420 includes an upper transparent plate 205, a black matrix 210, a color filter 220, a surface protection layer 230 and a common electrode 240 disposed in descending order, as illustrated. The black matrix 210 is formed on the upper transparent plate 205 to define a red pixel region, a green pixel region and a blue pixel region (e.g., for preventing a light from being leaked between pixels). The color filter 220 includes a red color filter portion disposed in the red pixel region, a green color filter portion disposed in the green pixel region and a blue color filter portion disposed in the blue pixel region. The surface protection layer 230 is formed on the upper transparent plate 205 having the black matrix 210 and the color filter 220 to protect the black matrix 210 and the color filter 220. The common electrode 240 is formed on the surface protection layer 230. In an alternative embodiment, at least two of the red, green and blue color filter portions are overlapped to form the black matrix 210.

The liquid crystal layer 300 disposed between the array substrate 100 and the color filter substrate 200 is configured to vary an arrangement of liquid crystal in the liquid crystal layer 300 in response to an electric field applied thereto. The electric field is formed by a voltage difference between the pixel electrode 160 of the array substrate 100 and the common electrode 240 of the color filter substrate 200 disposed on either side of the liquid crystal layer 300. In this manner, the liquid crystal layer 300 allows a front light to pass through the color filter substrate 200 or a backside light to pass through the transmission window defined by the absence of reflection layer 170.

A portion of the liquid crystal layer 300 corresponding to the contact hole 141 in the reflection region, a portion of the liquid crystal layer 300 corresponding to a remaining region of the reflection region, and a portion of the liquid crystal layer 300 corresponding to the transmission window all have different cell gaps relative to one another. A first cell gap d1 of the liquid crystal layer 300 corresponding to the contact hole 141 is larger than a second cell gap d2 of the liquid crystal layer 300 corresponding to the remaining region of the reflection region. A third cell gap d3 of the liquid crystal layer 300 corresponding to the transmission window is no smaller than the first cell gap d1 of the liquid crystal layer 300 corresponding to the contact hole 141.

It will be recognized that an optical characteristic Δnd1 of the liquid crystal layer 300 corresponding to the contact hole 141 is substantially equal to an anisotropy of a reflective index Δn multiplied by the first cell gap d1. Likewise, optical characteristics Δnd2 and Δnd3 of the liquid crystal layer 300 corresponding to the remaining region of the reflection region and transmission window are substantially equal to the anisotropy of the reflective index Δn multiplied by the second cell gap d2 and the third cell gap d3, respectively.

The first to third cell gaps d1 and d3, respectively, are determined in response to a liquid crystal of the liquid crystal layer 300, an optical condition of the array substrate, or an optical condition of the color filter substrate 200. In this exemplary embodiment, the second cell gap d2 corresponding to the reflection region is no more than about 1.7 μm, and the third cell gap d3 corresponding to the transmission region is no more than about 3.3 μm. The liquid crystal layer 300 may have a homogeneous alignment mode so that a twist angle of the liquid crystal layer 300 is about zero degrees.

In this exemplary embodiment, a lower alignment layer (not shown) of the array substrate 100 is rubbed in a first direction, and an upper alignment layer (also not shown) of the color filter substrate 200 is rubbed in a second direction that is substantially opposite to the first direction.

In this exemplary embodiment, voltages are applied to the pixel electrode 160 of the array substrate 100 and the common electrode 240 of the color filter substrate 200 forming an electric field that is applied to the liquid crystal layer 300. In an alternative embodiment, the array substrate 100 may include both the pixel electrode 160 and the common electrode 240 in place of forming the common electrode 240 on the color filter substrate.

The lower film assembly 410 includes a lower λ/4 retardation film 412 and a lower polarizer 414. The lower λ/4 retardation film 412 is disposed intermediate the array substrate 100 and the lower polarizer 414. The lower polarizer 414 is disposed under the lower λ/4 retardation film 412 and defines a bottom of the LCD apparatus as illustrated in FIG. 8.

When a horizontally polarized light is incident on the lower λ/4 retardation film 412 from a topside of the LCD apparatus, a phase of the horizontally polarized light is delayed by about 1/4 phase (λ/4) so that a right circularly polarized light is emitted from the lower λ/4 retardation film 412 toward the lower polarizer 414. When the right circularly polarized light is incident on the lower retardation film 412 from a topside of the LCD apparatus, a phase of the right circularly polarized light is delayed by about 1/4 phase (λ/4) so that the horizontally polarized light is emitted from the lower retardation film 412 toward the lower polarizer 414.

The lower polarizer 414 includes a first polarizing axis allowing a light that is polarized in the first polarizing axis to pass through the lower polarizer 414 toward the lower λ/4 retardation film 412 or the backside. For example, when the first polarizing axis is substantially parallel with the horizontal direction defining each of the plurality of layers of the LCD apparatus, the horizontally polarized light passes through the lower polarizer 414 from the backside so that the horizontally polarized light is incident on the lower λ/4 retardation film 412. In addition, the horizontally polarized light may pass through the lower polarizer 414 from the lower λ/4 retardation film 412 so that the horizontally polarized light is emitted from the lower polarizer 414 toward the backside.

The upper film assembly 420 is disposed on the color filter substrate 200 and includes an upper λ/4 retardation film 422 and an upper polarizer 424. The upper λ/4 retardation film 422 is disposed intermediate the upper polarizer 424 and the color filter substrate.

When a light from the color filter substrate 200 is incident on the upper λ/4 retardation film 422, a phase of the light is delayed by about 1/4 phase (λ/4) so that the light having the delayed phase is emitted from the upper λ/4 retardation film 422 toward a viewer's side.

When a light is incident on the upper λ/4 retardation film 422 from the viewer's side, a phase of the light is delayed by about 1/4 phase (λ/4) so that the light having the delayed phase is emitted from the upper λ/4 retardation film 422 toward color filter substrate 200.

The upper polarizer 424 includes a second polarizing axis allowing a light that is polarized in the second polarizing axis to pass through the upper polarizer 424 toward the upper λ/4 retardation film 422 from the viewer's side. For example, when the second polarizing axis is substantially parallel with a vertical direction or normal to the layers defining the LCD apparatus, the vertically polarized light passes through the upper polarizer 424 from the viewer's side so that the vertically polarized light is incident on the upper λ/4 retardation film 422. In addition, the vertically polarized light may pass through the upper polarizer 424 from the upper λ/4 retardation film 422 so that the vertically polarized light is emitted from the upper polarizer 424 toward the viewer's side.

In operation, when an artificial light generated from a lamp (not shown) is incident on the lower polarizer 414, a linearly polarized light that is a P wave is emitted from the lower polarizer 414 toward the viewer's side. When the linearly polarized light is incident on the lower λ/4 retardation film 412, an elliptically polarized light is emitted from the lower λ/4 retardation film 412 toward the viewer's side. When the elliptically polarized light is incident on the brightness enhancement layer 150, a substantially linearly polarized light that is a S-wave is emitted from the brightness enhancement layer 150 toward the viewer's side. The substantially linearly polarized light is reflected and scattered from the reflection layer 170 toward the backside. The linearly polarized light may be diffused from the reflection layer 170.

When the reflected light is incident on the brightness enhancement layer 150 from the viewer's side, the elliptically polarized light is emitted from the brightness enhancement layer 150 toward the backside. When the elliptically polarized light is incident on the lower λ/4 retardation film 412, the linearly polarized light (the P-wave) is emitted from the lower λ/4 retardation film 412 through the lower polarizer 414 toward the backside.

The linearly polarized light that passes through the lower polarizer 414 is then reflected from a lamp reflecting plate 60 (see FIG. 2) so that the reflected light is emitted from the lamp reflecting plate (not shown) toward the reflection layer 170 and out through the transmission window corresponding with an absence of the reflection layer 170. Therefore, a portion of the light generated from the lamp is recycled to improve a luminance of the LCD apparatus. In addition, a luminance of the LCD apparatus in a transmission mode is improved although a power consumption of the LCD apparatus need not be increased.

FIGS. 9A to 9E are cross-sectional views illustrating a method of manufacturing an array substrate 100 shown in FIG. 8.

Referring to FIG. 9A, a metal is deposited on the lower transparent plate 105. The metal may include tantalum (Ta), titanium (Ti), molybdenum (Mo), aluminum (Al), chromium (Cr), copper (Cu), or tungsten (W), for example, but is not limited thereto. The lower transparent plate 105 includes an insulating material, such as glass, ceramic, quartz, for example. The deposited metal is patterned to form a plurality of gate lines (not shown) and a plurality of the gate electrodes 110. The gate lines (not shown) are extended in a longitudinal direction with respect to the lower transparent plate 105, and aligned in a horizontal direction that is substantially perpendicular to the longitudinal direction. Each of the gate lines (not shown) is electrically connected to a portion of the gate electrodes 110 as recognized by those skilled in the pertinent art. A storage electrode (not shown) line may be formed together with the gate electrode 110.

A silicon nitride is deposited over the lower transparent plate 105 having the gate electrode 110 using a plasma chemical vapor deposition to form the gate insulating layer 112. An amorphous silicon layer is deposited on the gate insulating layer 112, and an n+ amorphous silicon layer is formed by implanting impurities on the amorphous silicon layer in-situ. The n+ amorphous silicon layer and the amorphous silicon layer are patterned to form the semiconductor layer 114 and the ohmic contact layer 116 disposed on the semiconductor layer 114.

A metal, for example, such as tantalum (Ta), titanium (Ti), molybdenum (Mo), aluminum (Al), chromium (Cr), copper (Cu), or tungsten (W), for example, is deposited on the gate insulating layer 112 having the semiconductor layer 114 and the ohmic contact layer 116. The deposited metal is then patterned to form a plurality of source lines (not shown), a plurality of the source electrodes 120 and a plurality of the drain electrodes 130. The source lines (not shown) are extended in the horizontal direction. Each of the source lines (not shown) is electrically connected to a portion of the source electrodes 120 as recognized by those skilled in the pertinent art. Each of the drain electrodes 130 is spaced apart from each of the source electrodes 120. In an alternative embodiment, a passivation layer may be formed over the gate insulating layer 112 having the semiconductor layer 114, the ohmic contact layer 116, the source electrode 120 and the drain electrode 130.

Figure 9B:
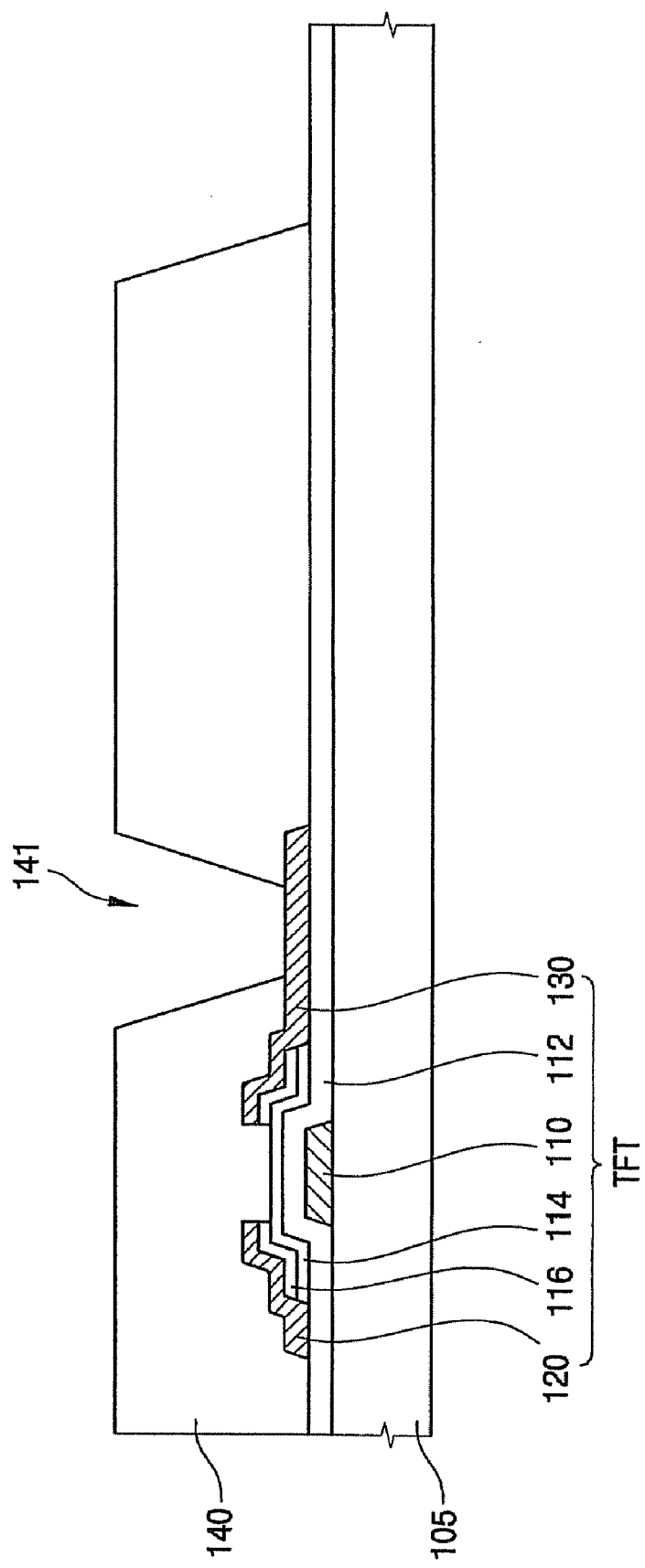

Referring to FIG. 9B, the organic insulating layer 140 is formed by coating a photoresist on the gate insulating layer 112 having the semiconductor layer 114, the ohmic contact layer 116, the source electrode 120, and the drain electrode 130 through a spin coating process. Portions of the organic insulating layer 140 are removed to form the contact hole 141, through which the drain electrode 130 is partially exposed, and the opening, through which the gate insulating layer 112 corresponding to the transmission window is exposed. The organic insulating layer 140 includes an acrylic resin and a positive photoresist. The contact hole 141 and the opening are formed through a photo process having an exposure step and a developing step. When an ultraviolet light is irradiated on a portion of the positive photoresist, the portion of the positive photoresist is removed during the developing step, and a remaining portion of the positive photoresist remains.

Referring to FIG. 9C, an ultraviolet curable liquid crystal polymer is coated and aligned on the organic insulating layer 140. The ultraviolet curable liquid crystal polymer may be a cholesteric liquid crystal illustrated in FIG. 3. An ultraviolet light is irradiated on the aligned ultraviolet curable liquid crystal polymer to fix the ultraviolet curable liquid crystal, thereby forming the brightness enhancement layer 150. In this exemplary embodiment, the brightness enhancement layer 150 has an uneven surface. The uneven surface may include an embossed pattern. The brightness enhancement layer 150 may be a biaxial film or a uniaxial film dependent on the polarization of the ultraviolet light irradiated thereon. When a polarized ultraviolet light is irradiated on the aligned ultraviolet curable liquid crystal polymer, the brightness enhancement layer 150 has the uniaxial film. When a non-polarized ultraviolet light is irradiated on the aligned ultraviolet curable liquid crystal polymer, the brightness enhancement layer 150 may be a C-plate.

Referring to FIG. 9D, the pixel electrode 160 is illustrated as being formed on the lower transparent plate 105 via the brightness enhancement layer 150 corresponding to each of the pixel regions. The pixel electrode 160 may be formed through a patterning or a selective deposition.

Figure 9E:
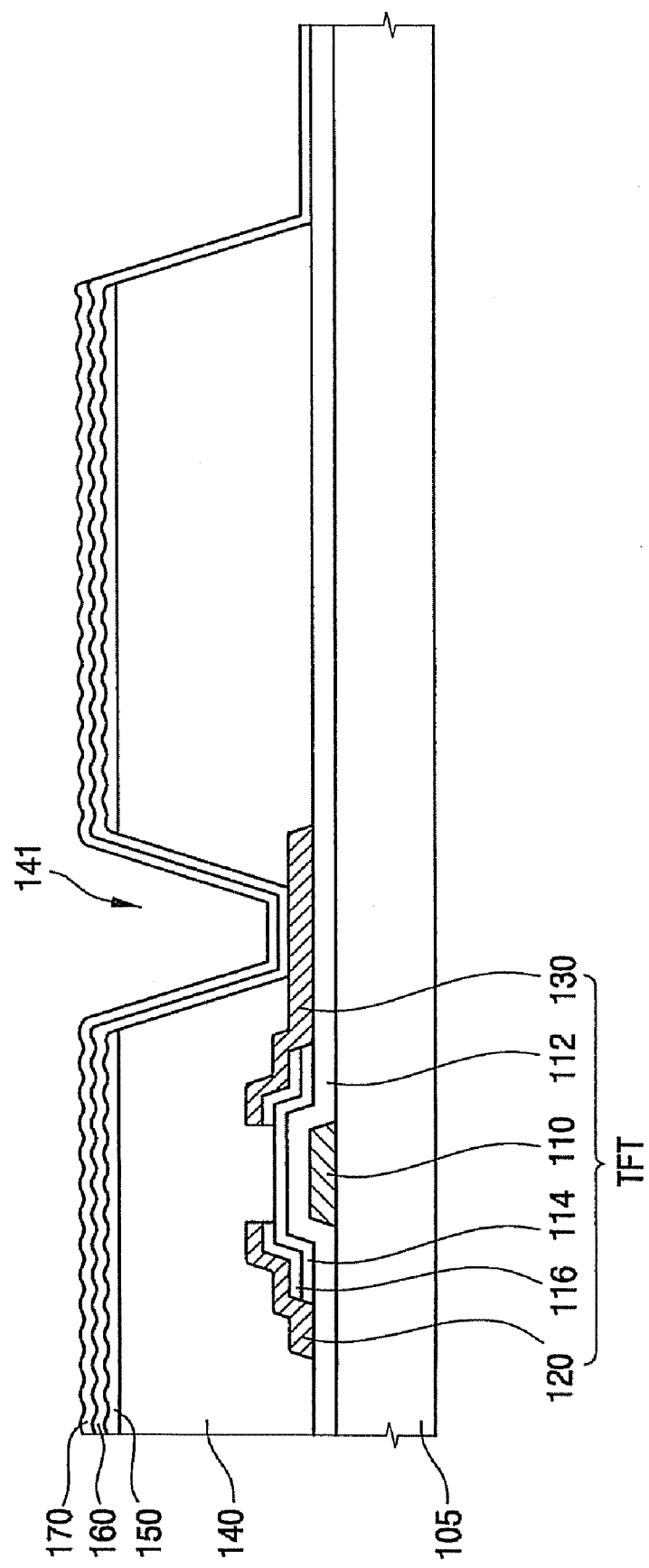

Referring to FIG. 9E, the reflection layer 170 is illustrated as being formed on the lower transparent plate 105 via the pixel electrode 160 corresponding to the reflection region. In an alternative embodiment, the lower alignment layer (not shown) may be formed on the transparent plate 105 having the reflection layer 170.

To complete manufacture of the LCD apparatus as illustrated in FIG. 8, the array substrate 100 is combined with the color filter substrate 200 with the liquid crystal layer 300 being formed between the array substrate 100 and the color filter substrate 200, FIGS. 10A to 10D are cross-sectional views illustrating brightness enhancement layers in accordance with other exemplary embodiments of the present invention. It will be recognized that the brightness enhancement layers of FIGS. 10A to 10D are defined with varying thicknesses or uneven surfaces along a length thereof.

Figure 10A:
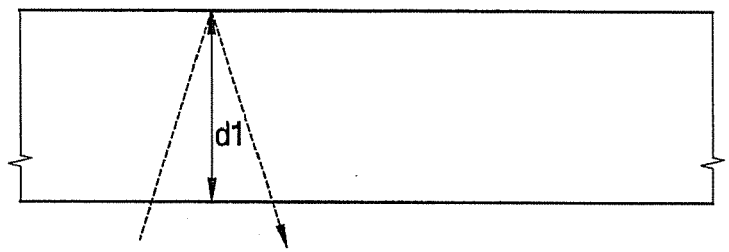
FIGS. 10A to 10D are cross-sectional views showing brightness enhancement layers in accordance with alternative exemplary embodiments of the present invention.

Referring to FIG. 10A, the brightness enhancement layer is defined with a uniform thickness d1 along a length thereof, thus a scattering portion is absent therefrom. A reflection layer may be disposed on the brightness enhancement layer in this embodiment. A light path of the brightness enhancement layer is about 2×d1, and an optical characteristic of the brightness enhancement layer is about 2×Δnd1.

Figure 10B:
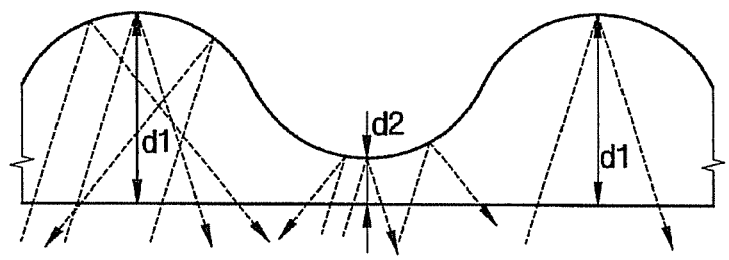

Referring to FIG. 10B, the brightness enhancement layer is defined with a plurality of convex and concave portions along a length thereof. Each of the convex portions has a first thickness d1, and each of the concave portions has a second thickness d2. In this embodiment, a reflection layer is disposed on the brightness enhancement layer.

A first light path of each of the convex portions is about 2×d1, and a second light path of each of the concave portion is about 2×d2. An optical characteristic of each of the convex portions is about 2×Δnd1, while an optical characteristic of each of the concave portions is about 2×Δnd2.

Figure 10C:
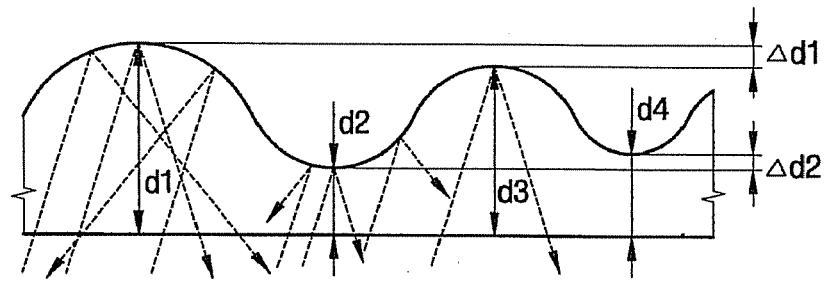

Referring to FIG. 10C, the brightness enhancement layer is defined with a plurality of convex portions and a plurality of concave portions along a length thereof. Thicknesses d1 and d3 of the convex portions are different from one another, as well as the thicknesses d2 and d4 of the concave portions. In this embodiment, a reflection layer is disposed on the brightness enhancement layer.

The convex portions provide various light paths of about 2×d1 and 2×d3, while the concave portions also provide various light paths of about 2×d2 and 2×d4, respectively. Optical characteristics of the convex portions are about 2×Δnd1 and 2×Δnd3, respectively, and optical characteristics of the concave portions are about 2×Δnd2 and 2×Δnd4, respectively.

Figure 10D:
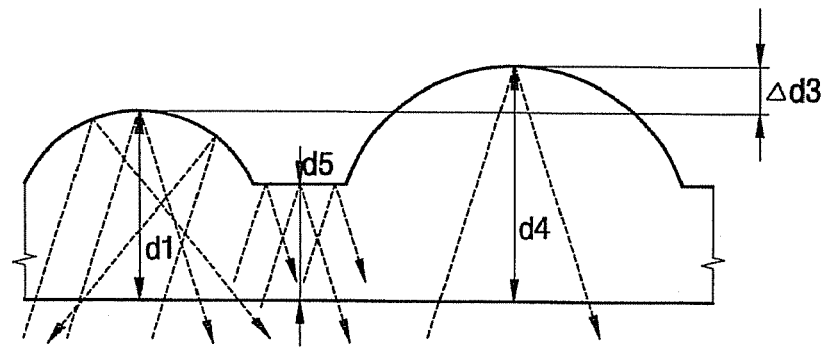

Referring to FIG. 10D, the brightness enhancement layer is defined with a plurality of convex portions and a plurality of flat portions intermediate adjacent convex portions. Thicknesses d1 and d4 of the convex portions are different from one another, while each of the flat portions has a fifth thickness d5. In this embodiment, a reflection layer is disposed on the brightness enhancement layer.

The convex portions provide various light paths of about 2×d1 and 2×d4, while a light path of each of the flat portions is about 2×d5. Optical characteristics of the convex portions are about 2×Δnd1 and 2×Δnd4, respectively, and an optical characteristic of each of the flat portions is about 2×Δnd5.

Figure 11:
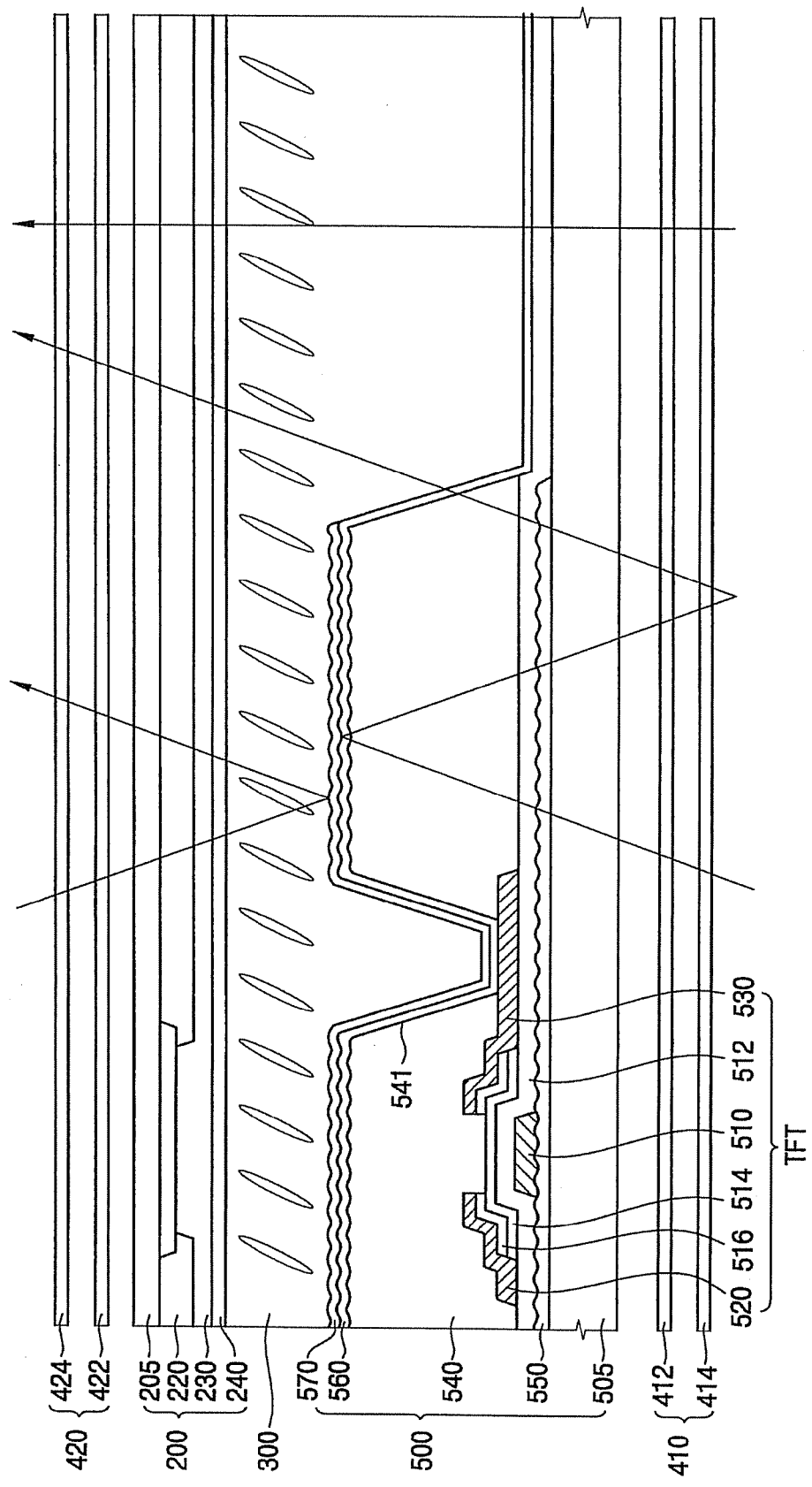
FIG. 11 is a cross-sectional view showing an LCD apparatus in accordance with another exemplary embodiment of the present invention.

FIG. 11 is a cross-sectional view illustrating an LCD apparatus in accordance with another exemplary embodiment of the present invention. A brightness enhancement layer 550 is disposed intermediate a lower transparent plate 505 and a TFT of an array substrate 500. The LCD apparatus of FIG. 11 is the same as in FIG. 8 except for the location of the brightness enhancement layer 550. Thus, the same reference numerals will be used to refer to the same or like parts as those described in FIG. 8 and any further explanation will be omitted.

The LCD apparatus includes the array substrate 500, a color filter substrate 200, a liquid crystal layer 300 disposed between the array substrate 500 and the color filter substrate 200, a lower film assembly 410 and an upper film assembly 420. The lower film assembly 410 and the upper film assembly 420 define outboard layers of the LCD apparatus as illustrated.

The array substrate 500 includes, disposed in ascending order as illustrated, the lower transparent plate 505, the brightness enhancement layer 550, the TFT, an organic insulating layer 540, a pixel electrode 560, and a reflection layer 570. The brightness enhancement layer 550 is disposed on the lower transparent plate 505 and below a gate insulating layer 512 formed on an opposite surface defining the lower transparent plate 505. The TFT includes a gate electrode 510 formed on the lower transparent plate 505, the gate insulating layer 512 formed on the lower transparent plate 505, a semiconductor layer 514, an ohmic contact layer 516, a source electrode 520, and a drain electrode 530. The organic insulating layer 540 is disposed over the TFT. The drain electrode 530 and the gate insulating layer 512 correspond to a reflection region and are partially exposed through a contact hole 541 and an opening of the organic insulating layer 540, respectively.

The lower transparent plate 505 includes the reflection region and a transmission window. The brightness enhancement layer 550 is disposed on the lower transparent plate 505 corresponding to the reflection region. In this exemplary embodiment, the brightness enhancement layer 550 is defined having an uneven surface facing the lower transparent plate 505. Convex and concave portions may be formed on the brightness enhancement layer 550 defining the uneven thickness. Therefore, when a light that has passed through the brightness enhancement layer 550 is reflected from the reflection layer 570 and passes through the brightness enhancement layer 550 toward a backside of the LCD apparatus (e.g., toward the lower film assembly 410), the light passes through various light paths corresponding to the uneven surface defining the brightness enhancement layer 550 having various optical characteristics Δnd.

The pixel electrode 560 is formed over the gate insulating layer 512 that is exposed through the opening of the brightness enhancement layer 550, the organic insulating layer 540 and the contact hole 541 so that the pixel electrode 560 is electrically connected to the drain electrode 530 of the TFT.

The reflection layer 570 is formed on the pixel electrode 560 and corresponds to the reflection region. A transmission window is defined by the absence of the reflection layer 570 on the pixel electrode 560. A capacitor line is optionally be formed intermediate the organic insulating layer 540 and the pixel electrode 560 in a region spaced apart from the TFT so that the capacitor line and a portion of the pixel electrode 560 form a storage capacitor $C_{st}$. In the exemplary embodiment of FIG. 11, the reflection layer 570 is formed on the pixel electrode 560, alternatively, an insulating layer may be disposed between the reflection layer 570 and the pixel electrode 560.

Therefore, a portion of the light generated from a lamp (not shown) is recycled to improve a luminance of the LCD apparatus. Furthermore, since the light from the lamp may not be incident on the TFT that partially absorbs the light, a luminance of a transmission mode of the LCD apparatus is improved.

Figure 12:
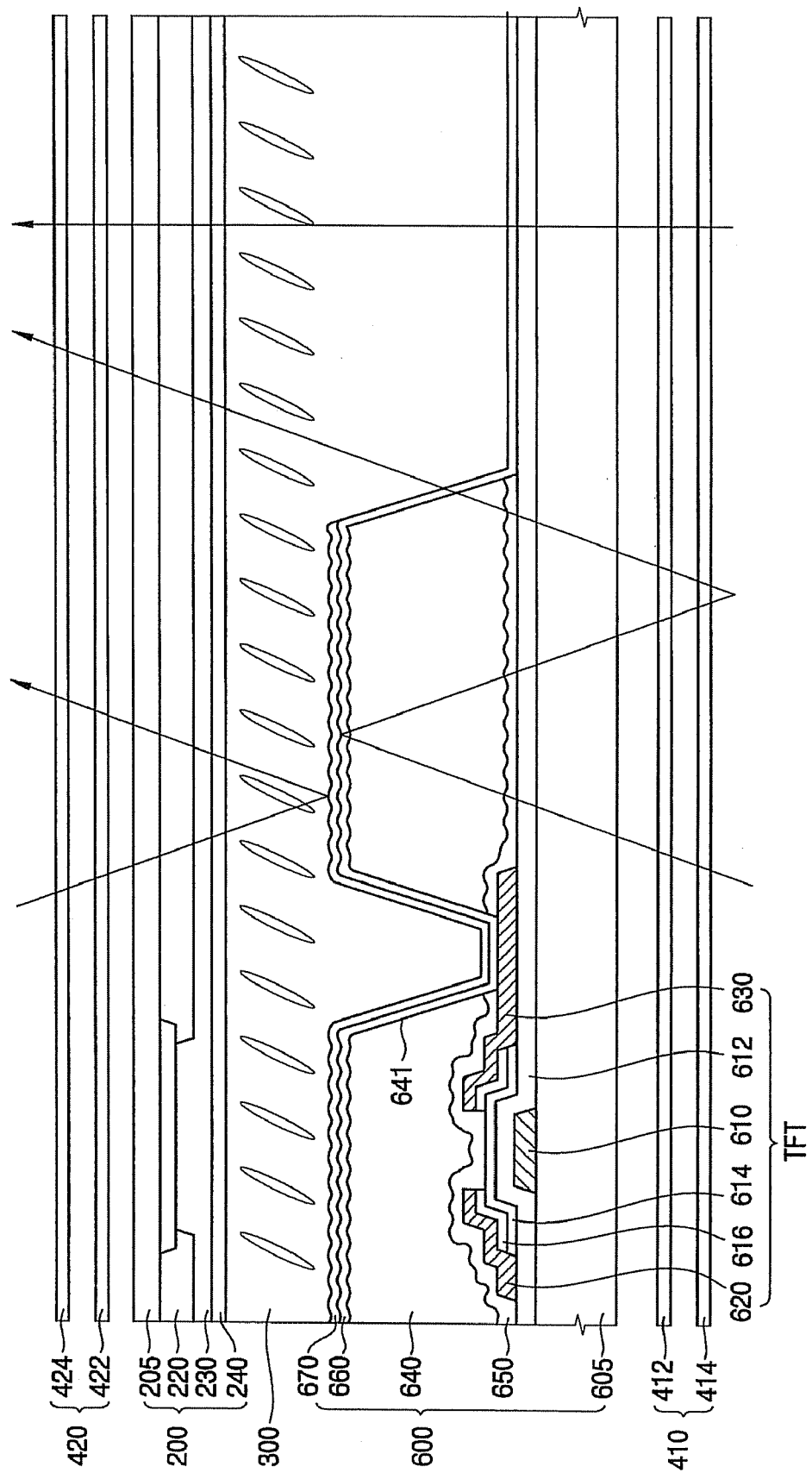
FIG. 12 is a cross-sectional view showing an LCD apparatus in accordance with another exemplary embodiment of the present invention.

FIG. 12 is a cross-sectional view illustrating an LCD apparatus in accordance with another exemplary embodiment of the present invention. In this embodiment, a brightness enhancement layer 650 is formed on a TFT. The LCD apparatus of FIG. 12 is the same as in FIG. 8 except for the location of the brightness enhancement layer 650. Thus, the same reference numerals will be used to refer to the same or like parts as those described in FIG. 8 and any further explanation will be omitted.

The LCD apparatus includes an array substrate 600, a color filter substrate 200, a liquid crystal layer 300 disposed intermediate the array substrate 600 and the color filter substrate 200, a lower film assembly 410, and an upper film assembly 420. The lower film assembly 410 and the upper film assembly 420 define outboard layers of the LCD apparatus as illustrated.

The array substrate 600 includes, disposed in ascending order as illustrated, a lower transparent plate 605, a TFT, the brightness enhancement layer 650, an organic insulating layer 640, a pixel electrode 660, and a reflection layer 670. The TFT includes a gate electrode 610 formed on the lower transparent plate 605, a gate insulating layer 612 formed on the lower transparent plate 605 having the gate electrode 610, a semiconductor layer 614, an ohmic contact layer 616, a source electrode 620, and a drain electrode 630. In this embodiment, it will be recognized that the brightness enhancement layer 650 is disposed on the TFT. Further, the organic insulating layer 640 is disposed over the gate insulating layer 612 having the brightness enhancement layer 650 thereon. The drain electrode 630 and the gate insulating layer 612 corresponding to a reflection region and a transmission window are partially exposed through a contact hole 641 and an opening of the organic insulating layer 640, respectively. The contact hole 641 and the opening are formed in the organic insulating layer 640 and the brightness enhancement layer 650.

The lower transparent plate 605 includes the reflection region and a transmission window. The brightness enhancement layer 650 is disposed on the source electrode 620, the drain electrode 630, the gate insulating layer 612, the semiconductor layer 614, and the lower transparent plate 605 corresponding to the reflection region. In this exemplary embodiment, the brightness enhancement layer 650 is defined with an uneven surface facing the organic insulating layer 640. The uneven thickness may be defined by convex and concave portions along a length of the brightness enhancement layer 650. Therefore, when a light that has passed through the brightness enhancement layer 650 is reflected from the reflection layer 670 and passes through the brightness enhancement layer 650 toward a backside of the LCD apparatus (e.g., toward the lower film assembly 410), the light passes through various light paths corresponding to the uneven brightness enhancement layer 650 having various optical characteristics Δnd.

The pixel electrode 660 is formed over the gate insulating layer 612 that is exposed through the opening of the brightness enhancement layer 650, the organic insulating layer 640, and the contact hole 641 so that the pixel electrode 660 is electrically connected to the drain electrode 630 of the TFT. The reflection layer 670 is formed on the pixel electrode 660 corresponding to the reflection region. A transmission window is defined by the absence of the reflection layer 670 on the pixel electrode 660. A capacitor line is optionally be formed intermediate the organic insulating layer 640 and the pixel electrode 660 in a region spaced apart from the TFT so that the capacitor line and a portion of the pixel electrode 660 may form a storage capacitor $C_{st}$. It will be recognized that in this exemplary embodiment, the reflection layer 670 is formed on the pixel electrode 660. Alternatively, an insulating layer may be disposed between the reflection layer 670 and the pixel electrode 660.

Figure 13:
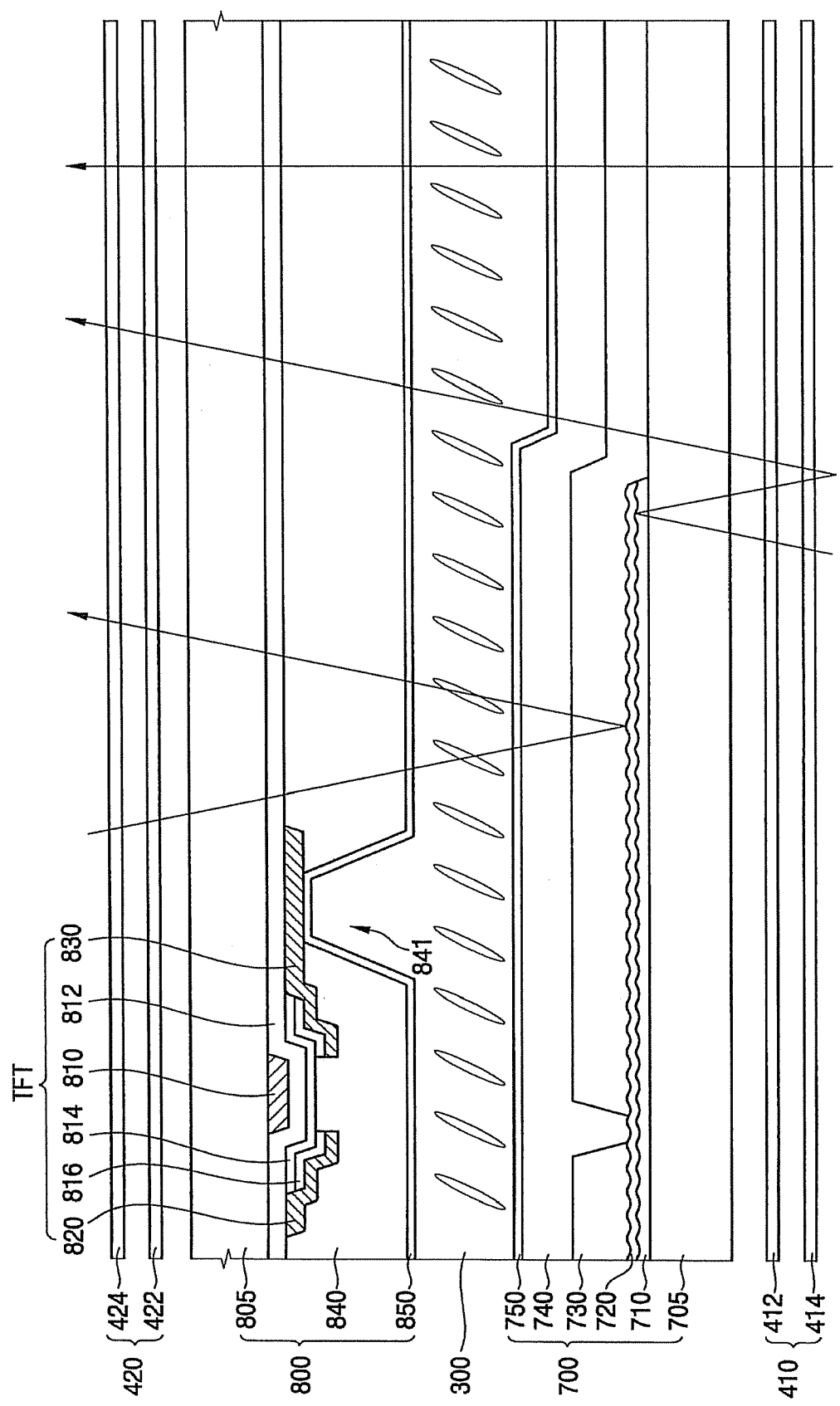
FIG. 13 is a cross-sectional view showing an LCD apparatus in accordance with another exemplary embodiment of the present invention.

FIG. 13 is a cross-sectional view illustrating an LCD apparatus in accordance with another exemplary embodiment of the present invention. In this embodiment, a brightness enhancement layer 710 is formed under a color filter 730.

The LCD apparatus includes a color filter substrate 700, an array substrate 800, a liquid crystal layer 300 disposed intermediate the array substrate 800 and the color filter substrate 700, a lower film assembly 410 and an upper film assembly 420. The lower film assembly 410 and the upper film assembly 420 define outboard layers of the LCD apparatus as illustrated, while the color filter substrate 700 is disposed under the array substrate 800 and intermediate the liquid crystal layer 300 and the lower film assembly 410.

The color filter substrate 700 includes, disposed in ascending order as illustrated in FIG. 13, a lower transparent plate 705, a brightness enhancement layer 710, a reflection layer 720, a color filter 730, a surface protection layer 740 and a common electrode 750. The brightness enhancement layer 710 is disposed on the reflection layer 720 corresponding the reflection region. The color filter 730 includes a red color filter portion, a green color filter portion and a blue color filter portion. The red color filter portion is disposed in a red pixel region, the green color filter portion is disposed in a green pixel region, and the blue color filter portion is disposed in a blue pixel region. The surface protection layer 740 is disposed on the lower transparent plate 705 having the brightness enhancement layer 710 and the reflection layer 720. In this exemplary embodiment, the brightness enhancement layer 710 is defined with an uneven surface. The uneven surface may be defined by convex and concave portions formed along a length of the brightness enhancement layer 710. In this embodiment, as illustrated, convex and concave portions of the brightness enhancement layer face the reflection layer 720.

The lower transparent plate 705 includes the reflection region and a transmission window. The reflection layer 720 corresponds to the reflection region, while a transmission window is defined by an absence of the reflection layer 720 and on the lower transparent plate 705.

When a light that has passed through the brightness enhancement layer 750 is reflected from the reflection layer 720 and passes through the brightness enhancement layer 710 toward a backside of the LCD apparatus (e.g., toward the lower film assembly 410), the light passes through various light paths corresponding to the uneven brightness enhancement layer 710 having various optical characteristics Δnd.

The array substrate 800 includes, disposed in descending order as illustrated in FIG. 13, an upper transparent plate 805, a TFT, an organic insulating layer 840, and a pixel electrode 850. The TFT includes a gate electrode 810 disposed under the upper transparent plate 805, a gate insulating layer 812 disposed under the upper transparent plate 805 having the gate electrode 810, a semiconductor layer 814, an ohmic contact layer 816, a source electrode 820, and a drain electrode 830. The organic insulating layer 840 is disposed under the upper transparent plate 805 having the TFT. The drain electrode 830 is partially exposed through a contact hole 841.

The pixel electrode 850 is formed intermediate the organic insulating layer 840 and the liquid crystal layer 300. In particular, the pixel electrode 850 is formed under the organic insulating layer 840 and the contact hole 841 allowing the pixel electrode 850 to be electrically connected to the drain electrode 830 of the TFT.

The pixel electrode 850 is a transparent electrode that includes indium tin oxide (ITO), tin oxide (TO), indium zinc oxide (IZO), and zinc oxide (ZO), for example, but is not limited thereto. A capacitor line is optionally formed intermediate the organic insulating layer 840 and the pixel electrode 850 in a region spaced apart from the TFT so that the capacitor line and a portion of the pixel electrode 850 may form a storage capacitor $C_{st}$.

The liquid crystal layer 300 is disposed between the array substrate 800 and the color filter substrate 700 to vary an arrangement of the liquid crystal in response to an electric field applied to the liquid crystal layer 300. The electric field is formed by a voltage difference between the pixel electrode 850 of the array substrate 800 and the common electrode 750 of the color filter substrate 700. Therefore, a front light that has passed through the array substrate 800 or a backside light that has passed through the transmission window defined by the reflection layer 720 is dependent on the electric field formed by a voltage difference between the pixel electrode 850 and the common electrode 750.

A portion of the liquid crystal layer 300 corresponding to a contact hole 841 in the reflection region, a portion of the liquid crystal layer 300 corresponding to a remaining region of the reflection region, and a portion of the liquid crystal layer 300 corresponding to the transmission window have different cell gaps relative to one another. As described above, the pixel electrode 850 is electrically connected to the drain electrode 830 of the TFT through the contact hole 841. A first cell gap d1 of the liquid crystal layer 300 corresponding to the contact hole 841 is larger than a second cell gap d2 of the liquid crystal layer 300 corresponding to the remaining region of the reflection region. A third cell gap d3 of the liquid crystal layer 300 corresponding to the transmission window is less than the first cell gap d1 of the liquid crystal layer 300 corresponding to the contact hole 841 but is greater than the second cell gap d2 of the liquid crystal layer 300 corresponding to the remaining region of the reflection region.

An optical characteristic Δnd1 of the liquid crystal layer 300 corresponding to the contact hole 841 is substantially equal to an anisotropy of a reflective index Δn multiplied by the first cell gap d1. Likewise, optical characteristics Δnd2 and Δnd3 of the liquid crystal layer 300 corresponding to the remaining region of the reflection region and the transmission region are substantially equal to the anisotropy of the reflective index Δn multiplied by the second cell gap d2 and the third cell gap d3, respectively. The surface protection layer 730 is defined having a stepped portion corresponding to an interface between the reflection region and the transmission window so that a height of the color filter substrate 700 corresponding to the reflection region is larger than a height of the color filter substrate 700 corresponding to the transmission window. This feature is also exemplified by cell gap d3 being larger than cell gap d2 in FIG. 13.

The first, second and third cell gaps are determined in response to a liquid crystal of the liquid crystal layer 300, an optical condition of the array substrate, or an optical condition of the color filter substrate. In this exemplary embodiment, the second cell gap d2 corresponding to the reflection region is no more than about 1.7 μm, while the third cell gap d3 corresponding to the transmission region is no more than about 3.3 μm.

The liquid crystal layer 300 may have a homogeneous alignment mode so that a twist angle of the liquid crystal layer 300 is about zero degrees.

In this exemplary embodiment, an upper alignment layer (not shown) of the array substrate 800 is rubbed in a first direction, and a lower alignment layer (not shown) of the color filter substrate 700 is rubbed in a second direction substantially opposite to the first direction.

In this exemplary embodiment, when a voltage is applied to the pixel electrode 850 of the array substrate 800 and the common electrode 750 of the color filter substrate 700, the electric field formed by the voltage is applied to the liquid crystal layer 300. In an alternative embodiment, the array substrate 800 may include the pixel electrode 850 and the common electrode 750.

The lower film assembly 410 includes a lower λ/4 retardation film 412 and a lower polarizer 414. The lower λ/4 retardation film 412 is disposed under the array substrate 800 and intermediate the lower transparent plate 705 and the lower polarizer 414, as illustrated in FIG. 13. The lower polarizer 414 is disposed under the lower λ/4 retardation film 412 and defines the backside of the LCD apparatus.

When a horizontally polarized light is incident on the lower λ/4 retardation film 412, a phase of the horizontally polarized light is delayed by about 1/4 phase (λ/4) so that a right circularly polarized light is emitted from the lower λ/4 retardation film 412 toward the lower polarizer 414. When the right circularly polarized light is incident on the lower retardation film 412, a phase of the right circularly polarized light is delayed by about 1/4 phase (λ/4) so that the horizontally polarized light is emitted from the lower retardation film 412 toward the lower polarizer 414.

The lower polarizer 414 includes a first polarizing axis allowing a light that is polarized in the first polarizing axis to pass through the lower polarizer 414 toward the lower λ/4 retardation film 412 or the backside of the LCD apparatus. For example, when the first polarizing axis is substantially parallel with the horizontal direction relative to the LCD apparatus having layers extending in the same direction, the horizontally polarized light passes through the lower polarizer 414 from the backside so that the horizontally polarized light is incident on the lower λ/4 retardation film 412. In addition, the horizontally polarized light may pass through the lower polarizer 414 from the lower λ/4 retardation film 412 allowing the horizontally polarized light to be emitted from the lower polarizer 414 toward the backside.

The upper film assembly 420 includes an upper λ/4 retardation film 422 and an upper polarizer 424. The upper λ/4 retardation film 422 is disposed on the upper transparent plate 805 of the array substrate 800. The upper polarizer 424 is disposed on the upper λ/4 retardation film 422, which is intermediate the upper λ/4 retardation film 422 and the upper λ/4 retardation film 422.

When a light is incident on the upper λ/4 retardation film 422 from the array substrate 800, a phase of the wavelength of the light is delayed by about 1/4 phase (λ/4) so that the light having the delayed phase is emitted from the upper λ/4 retardation film 422 toward the upper λ/4 retardation film 422 corresponding to a viewer's side. When a light is incident on the upper λ/4 retardation film 422 from the viewer's side, a phase of the light is delayed by about 1/4 phase (λ/4) so that the light having the delayed phase is emitted from the upper λ/4 retardation film 422 toward the array substrate 800.

The upper polarizer 424 includes a second polarizing axis allowing a light that is polarized in the second polarizing axis to pass through the upper polarizer 424 toward the upper λ/4 retardation film 422 from the viewer's side. For example, when the second polarizing axis is substantially parallel with a vertical direction relative to stacking layers defining the LCD apparatus, the vertically polarized light passes through the upper polarizer 424 from the viewer's side allowing the vertically polarized light to be incident on the upper λ/4 retardation film 422. In addition, the vertically polarized light may pass through the upper polarizer 424 from the upper λ/4 retardation film 422 allowing the vertically polarized light to be emitted from the upper polarizer 424 toward the viewer's side.

Figure 14:
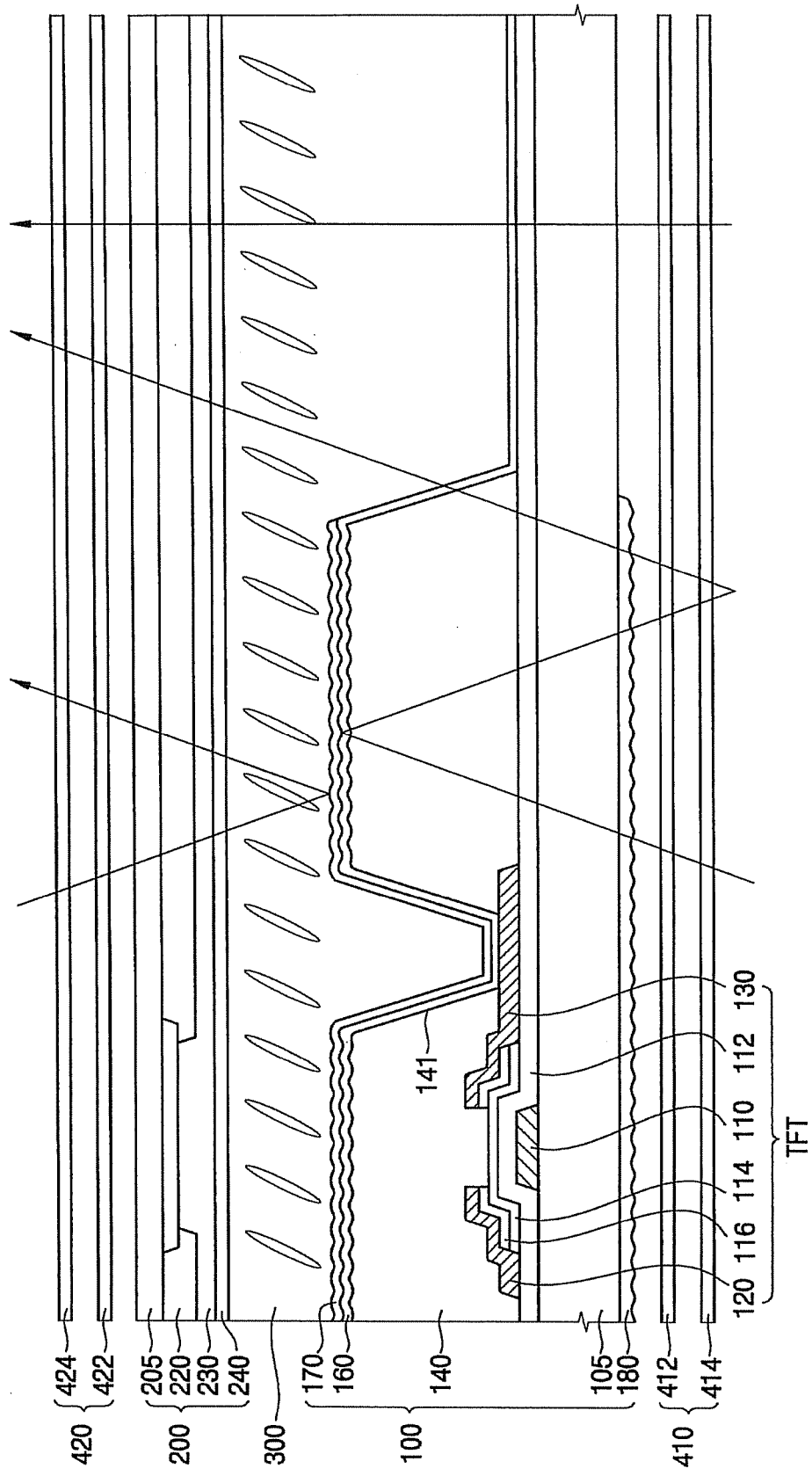
FIG. 14 is a cross-sectional view showing an LCD apparatus in accordance with another exemplary embodiment of the present invention.

FIG. 14 is a cross-sectional view illustrating an LCD apparatus in accordance with another exemplary embodiment of the present invention. In this embodiment, a brightness enhancement layer 180 is disposed under a lower transparent plate 105 corresponding to a reflection region. The LCD apparatus of FIG. 14 is the same as in FIG. 8 except for the location of the brightness enhancement layer 180. Thus, the same reference numerals will be used to refer to the same or like parts as those described in FIG. 8 and any further explanation will be omitted.

The LCD apparatus includes an array substrate 100, a color filter substrate 200, a liquid crystal layer 300 disposed intermediate the array substrate 100 and the color filter substrate 200, a lower film assembly 410 and an upper film assembly 420. The lower film assembly 410 and the upper film assembly 420 define outboard layers of the LCD apparatus as illustrated.

The brightness enhancement layer 180 is disposed under the array substrate 100 and disposed intermediate the lower transparent plate 105 and the lower film assembly 410, as illustrated. In this exemplary embodiment, the brightness enhancement layer 180 is integrally formed under the array substrate 100. Alternatively, the brightness enhancement layer 180 may be integrally formed on the lower film assembly 410. The brightness enhancement layer 180 is defined having an uneven thickness. The uneven thickness may include convex and concave portions formed on the brightness enhancement layer 180. In the embodiment illustrated in FIG. 14, convex and concave portions define a surface of the brightness enhancement layer 180 facing the lower film assembly 410 along a length thereof. Therefore, when a light that has passed through the brightness enhancement layer 180 is reflected from a reflection layer 170 and passes through the brightness enhancement layer 180 toward a backside of the LCD apparatus, the light passes through various light paths corresponding to the uneven brightness enhancement layer 180 having various optical characteristics Δnd.

Therefore, a portion of the light generated from a lamp (not shown) is recycled to improve a luminance of the LCD apparatus. In addition, the light may not be incident on the TFT that partially absorbs the light so that a luminance of the LCD apparatus in a transmission mode is improved.

According to the present invention, a brightness enhancement layer is formed corresponding to a reflection region of an array substrate so that at least a portion of light generated from a lamp is recycled. More specifically, the brightness enhancement layer allows a portion of the light that is reflected from a reflection layer to be recycled to improve a luminance of an LCD apparatus. Furthermore, the addition of the brightness enhancement layer allows a decrease in power consumption of the LCD apparatus.

While this invention has been described with reference to the exemplary embodiments disclosed herein, it is evident, however, that many alternative modifications and variations will be apparent to those having skill in the art in light of the foregoing description. Accordingly, the present invention embraces all such alternative modifications and variations falling within the spirit and scope of the appended claims.

What is claimed is:

1. A substrate comprising:
   an insulating plate having a pixel area, the pixel area defined by a reflection region and a transmission window;
   a switching element formed in the pixel area;
   a pixel electrode electrically connected to the switching element;
   a reflection layer disposed in alignment with the reflection region, the reflection layer being receptive to a front light emitted from a viewer's side outside of the substrate being reflected from the reflection layer toward the viewer's side, the reflection layer being receptive to a backside light emitted from a backside of the substrate opposite the viewer's side being reflected from the reflection layer toward the backside; and
   a brightness enhancement layer formed intermediate the reflection layer and the backside light, wherein the backside light being emitted from the backside toward the reflection layer through the brightness enhancement layer becomes a reflection light being emitted from the reflection layer toward the backside through the brightness enhancement layer,
   wherein the brightness enhancement layer delays a phase of the backside light by about 1/4 phase providing a phase-delayed backside light to the reflection layer, and the brightness enhancement layer delays a phase of the reflection light by about 1/4 phase providing a phase-delayed reflection light to the backside.

2. The substrate of claim 1, wherein the brightness enhancement layer delays a phase of the backside light providing a phase-delayed backside light to the reflection layer, and the brightness enhancement layer delays a phase of the reflection light to providing a phase-delayed reflection light to the backside.

3. The substrate of claim 1, wherein the brightness enhancement layer is defined having a substantially identical thickness.

4. The substrate of claim 1, wherein the brightness enhancement layer is defined by a first surface and an opposite second surface integrally formed with the first surface, the first surface being disposed facing a reflection layer, the first and second surfaces each being substantially non-planar.

5. The substrate of claim 1, wherein the brightness enhancement layer is disposed between the insulating plate and the switching element.

6. The substrate of claim 1 wherein the brightness enhancement layer is disposed between the switching element and the pixel electrode.

7. The substrate of claim 1, further including:
   an organic insulating layer disposed over the switching element of which a drain electrode is exposed in the reflection region, the substrate being exposed in the transmission window; and a passivation layer disposed over the organic insulating layer, the passivation layer being formed on the pixel electrode connected with the reflection layer, wherein the reflection layer is formed in an upper area defining the passivation layer corresponding to the reflection region.

8. The substrate of claim 7, wherein the brightness enhancement layer is formed on a surface of the organic insulating layer.

9. The substrate of claim 1, further comprising:
a color filter formed in the pixel area; and
a common electrode layer formed on the insulating plate having the color filter in the pixel area.

10. The substrate of claim 1, wherein the brightness enhancement layer is disposed under the transmission window and delays a phase of the backside light by about 1/4 phase providing a phase-delayed backside light to the transmission window.

11. A phase delay element for a LCD apparatus comprising:
a brightness enhancement layer disposed between a backlight and a reflection layer, the brightness enhancement layer defined by a bottom member and a counter member, the counter member being integrally formed with the bottom member, the counter member being disposed facing the reflection layer, wherein a first light having a wavelength phase ($\lambda$) incident on the bottom member is delayed by about 1/4 phase ($\lambda/4$) emitting a second light that from the counter member toward the reflection layer, the second light being reflected from the reflection layer to become a third light that is emitted from the reflection layer toward the counter member, a phase of the third light is delayed by about 1/4 phase ($\lambda/4$) passing through the brightness enhancement layer emitting a fourth light from the bottom member.

12. The phase delay element of claim 11, wherein the first light is circularly polarized, the second light and the third light are vertically polarized, and the fourth light is circularly polarized in a same direction as a direction of the first light.

13. The phase delay element of claim 11, wherein the counter member is defined with a substantially non-planar surface.

14. The phase delay element of claim 11, wherein the bottom member is defined with a substantially non-planar surface.

15. The phase delay element of claim 11, wherein the bottom member and the counter member are solidified cholesteric liquid crystal.

16. The phase delay element of claim 11, wherein the counter member is defined with concave and convex portions.

17. The phase delay element of claim 16, wherein the concave and convex portions of the counter member are rounded.

18. The phase delay element of claim 16, wherein the concave portions of the counter member are defined with flat sections, and the convex portions of the counter member are defined by rounded sections.

* * * * *